United States Patent
Park et al.

(10) Patent No.: US 12,328,691 B2
(45) Date of Patent: Jun. 10, 2025

(54) METHOD FOR SETTING TIME DIFFERENCE IN IAB SYSTEM, AND DEVICE USING METHOD

(71) Applicant: LG ELECTRONICS INC., Seoul (KR)

(72) Inventors: Haewook Park, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 582 days.

(21) Appl. No.: 17/765,609

(22) PCT Filed: Apr. 8, 2021

(86) PCT No.: PCT/KR2021/004407
§ 371 (c)(1),
(2) Date: Mar. 31, 2022

(87) PCT Pub. No.: WO2021/206465
PCT Pub. Date: Oct. 14, 2021

(65) Prior Publication Data
US 2022/0353830 A1  Nov. 3, 2022

(30) Foreign Application Priority Data
Apr. 9, 2020  (KR) .................. 10-2020-0043584

(51) Int. Cl.
*H04W 56/00*  (2009.01)
(52) U.S. Cl.
CPC ................. *H04W 56/001* (2013.01)

(58) Field of Classification Search
CPC .................................................. H04W 56/001
USPC ........................................................ 370/350
See application file for complete search history.

(56) References Cited

U.S. PATENT DOCUMENTS

| | | |
|---|---|---|
| 2019/0313433 A1 | 10/2019 | Abedini et al. |
| 2022/0078740 A1* | 3/2022 | Harada ............. H04W 56/0045 |
| 2022/0182956 A1* | 6/2022 | Dortschy .......... H04W 56/0045 |
| 2022/0272699 A1* | 8/2022 | Zhuo .................... H04L 1/1614 |
| 2023/0156644 A1* | 5/2023 | Bi ........................ H04W 56/005 370/503 |
| 2024/0073839 A1* | 2/2024 | Kurita ............... H04W 56/0045 |

FOREIGN PATENT DOCUMENTS

WO  2019-194737  10/2019

OTHER PUBLICATIONS

Huawei et al., Remaining issue for the Timing Delta MAC CE, R2-2000527, 3GPP TSG-RAN WG2 Meeting #109-e, Feb. 14, 2020, see sections 1-2; table 1; and figure 1.

(Continued)

*Primary Examiner* — Faisal Choudhury
(74) *Attorney, Agent, or Firm* — Bryan Cave Leighton Paisner LLP

(57) ABSTRACT

A method and a device by which an IAB node sets a time difference in a wireless communication system are provided. The method determines the time difference between MT reception of an IAB node and DU transmission of the IAB node, on the basis of preset parameters that differ in frequency ranges of the IAB node and time difference setting information received from a parent node.

11 Claims, 25 Drawing Sheets

(56) References Cited

OTHER PUBLICATIONS

ZTE et al., TP for Timing Delta MAC CE, R2-2000507, 3GPP TSG-RAN WG2 Meeting #109-e, Feb. 14, 2020, see section 6.1.3.x; and figure 6.1.3.x-1.
Samsung, Introduction of Integrated Access and Backhaul for NR, R2-2002405, 3GPP TSG-RAN WG2 Meeting #109-e, Mar. 12, 2020, see section 6.1.3.x.

* cited by examiner

METHOD FOR SETTING TIME DIFFERENCE IN IAB SYSTEM, AND DEVICE USING METHOD

This application is the National Stage filing under 35 U.S.C. 371 of International Application No. PCT/KR2021/004407 filed on Apr. 8, 2021, which claims priority to Korean Patent Application No. 10-2020-0043584 filed on Apr. 9, 2020, the contents of which are all hereby incorporated by reference herein in their entirety.

BACKGROUND OF THE DISCLOSURE

Field of the Disclosure

The present disclosure relates to wireless communication.

Related Art

One potential technology intended to enable future cellular network deployment scenarios and applications is supporting wireless backhaul and relay links, which enables a flexible and highly dense deployment of NR cells without needing to proportionally densify a transport network. It allows for flexible and very dense deployment.

With massive MIMO or a native deployment of multi-beam system, a greater bandwidth (e.g., mmWave spectrum) is expected to be available in NR than in LTE, and thus occasions for the development and deployment of integrated access and backhaul links arise. This allows an easy deployment of a dense network of self-backhauled NR cells in an integrated manner by establishing a plurality of control and data channels/procedures defined to provide connection or access to UEs. This system is referred to as an integrated access and backhaul (IAB) link.

SUMMARY

The present specification proposes a method for setting a timing difference in the IAB system and an apparatus using the method.

Advantageous Effects

According to the present specification, a method for determining a signal transmission/reception timing of an IAB node more suitable for a next-generation communication system using a wider frequency band than in the prior art is proposed. Accordingly, it is possible to transmit and receive signals more suitable for a next-generation communication system, and furthermore, communication efficiency is increased.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

DESCRIPTION OF EXEMPLARY EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B."

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Figure 1:
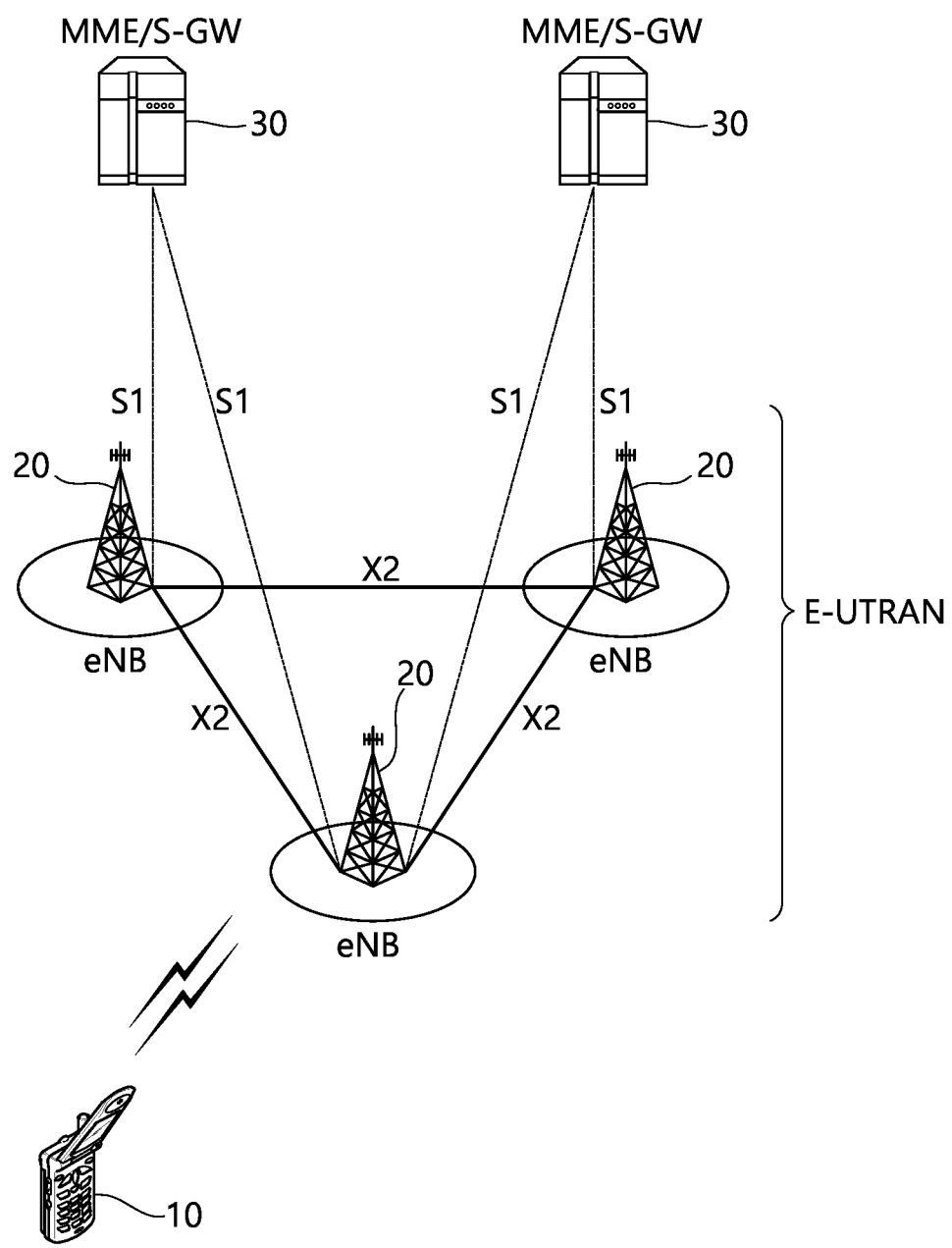
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
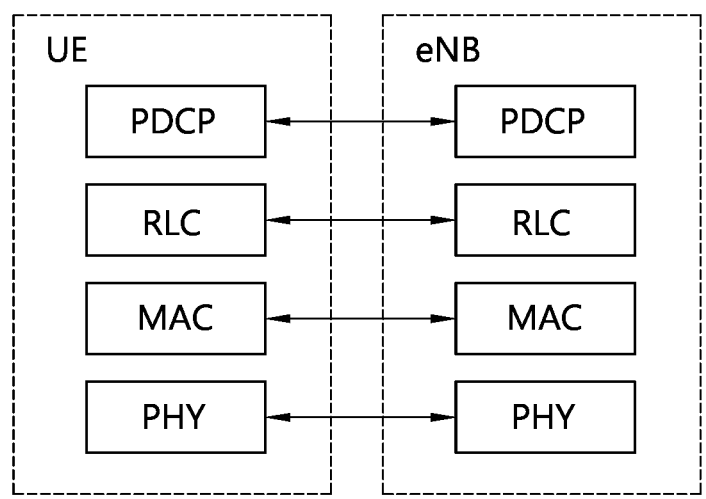
FIG. 2 is a diagram showing a wireless protocol architecture for a user plane.
Figure 3:
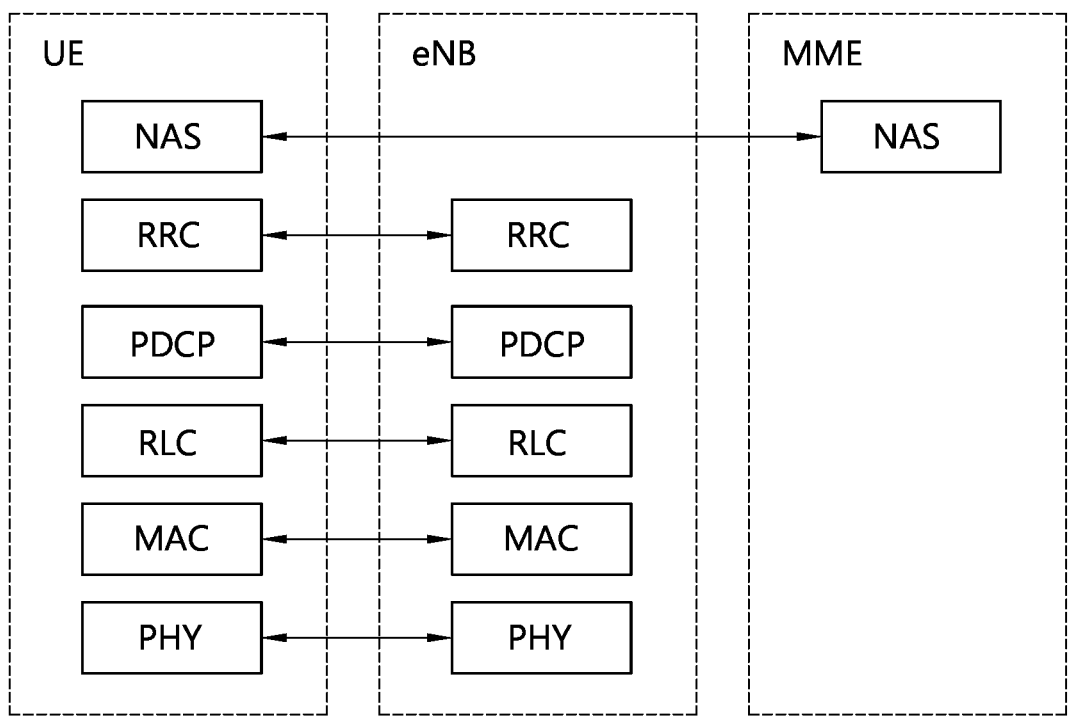
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission, e.g., a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
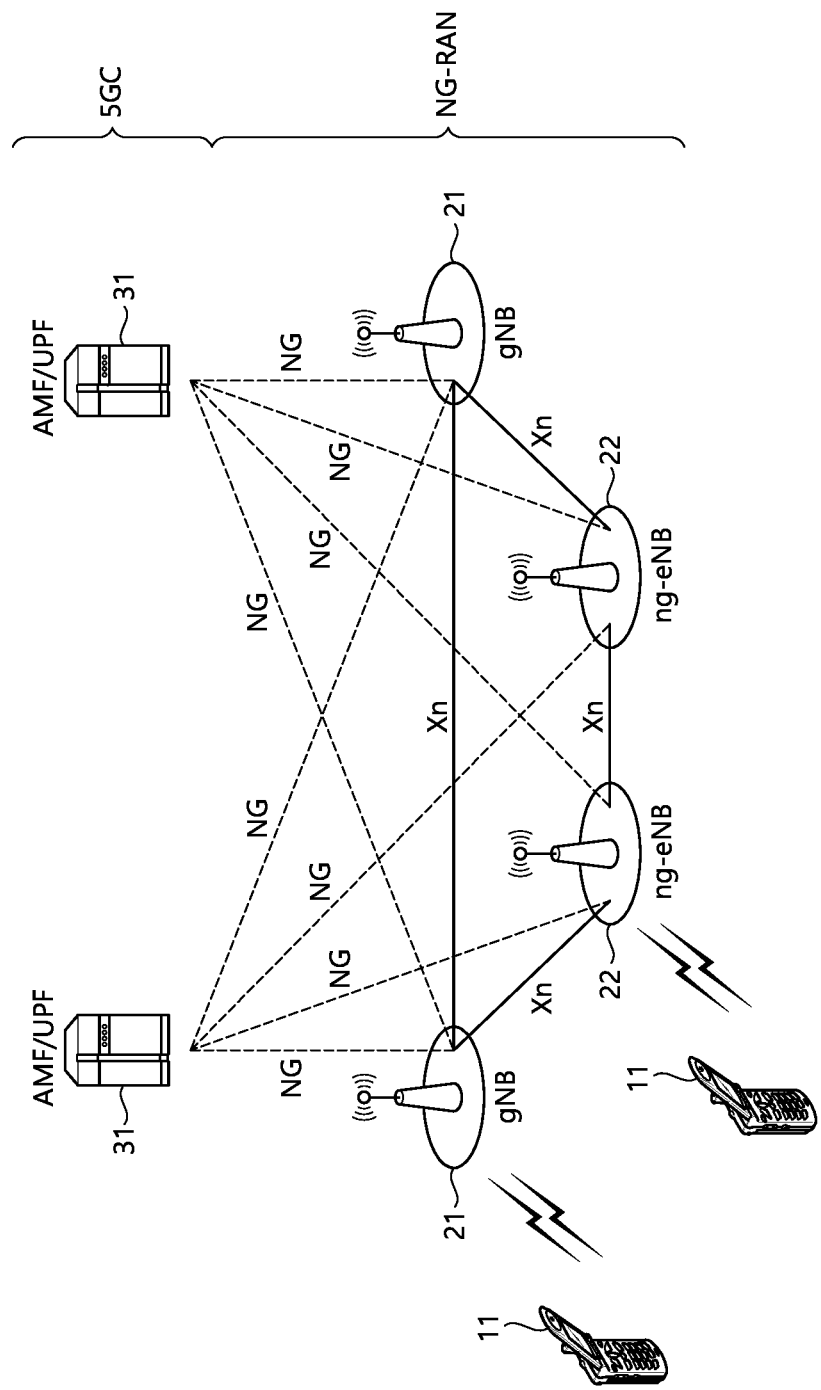
FIG. 4 shows another wireless communication system to which the present disclosure may be applied.

FIG. 4 shows another wireless communication system to which the present disclosure may be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5$^{th}$ generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
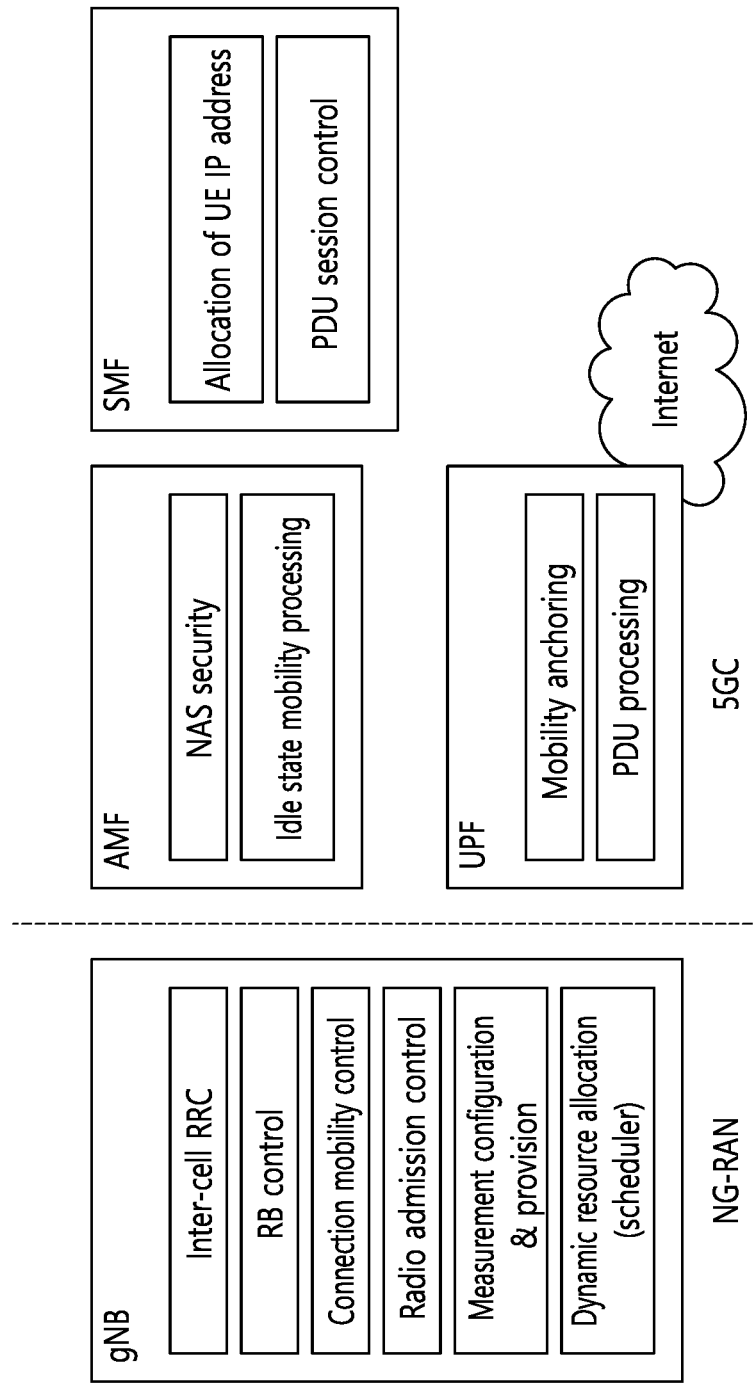
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
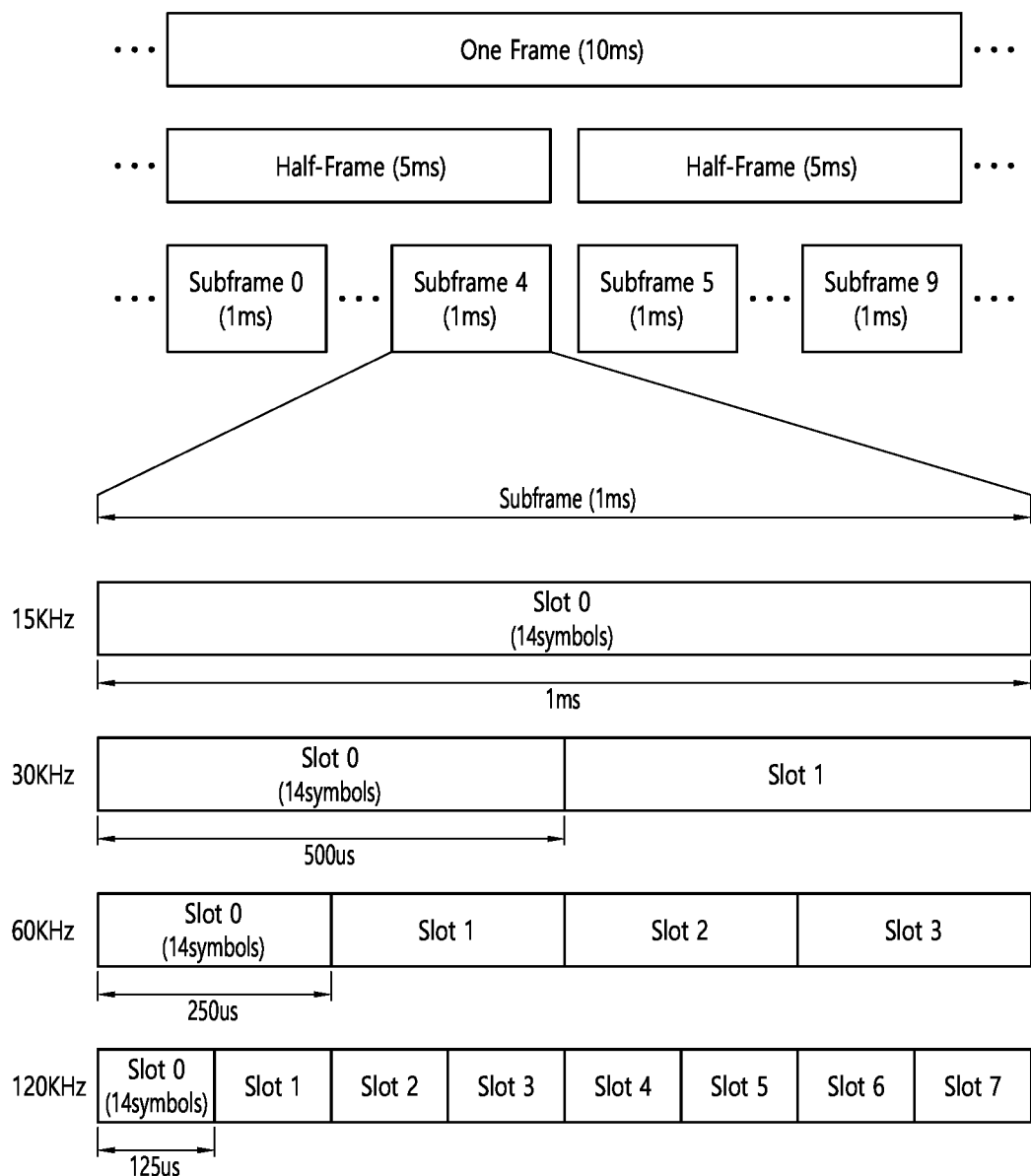
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in a subframe according to subcarrier spacings.

The following table 1 illustrates a subcarrier spacing configuration µ.

TABLE 1

| µ | $\Delta f = 2^\mu \cdot 15[kHz]$ | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations µ.

TABLE 2

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS(15*2^ μ) | $N^{slot}_{symb}$ | $N^{frame, \mu}_{slot}$ | $N^{subframe, \mu}_{slot}$ |
|---|---|---|---|
| 60 KHz (μ = 2) | 12 | 40 | 4 |

NR supports multiple numbers (or subcarrier spacing (SCS)) to support various 5G services. For example, when the SCS is 15 kHz, a wide region in the legacy cellular band is supported; and when the SCS is 30 kHz/60 kHz, dense urban areas, low time delay and wide carrier bandwidth are supported; and when the SCS is 60 kHz or more, a bandwidth of more than 24.25 GHz is supported in order to overcome phase noise.

The NR frequency band may be defined as two types of frequency ranges (FR1 and FR2). A numerical value of the frequency range may be changed and, for example, the two types of frequency ranges (FR1 and FR2) may be as shown in Table 4 below. For convenience of explanation, among the frequency ranges used in the NR system, FR1 may refer to "sub 6 GHz range" and FR2 may refer to "above 6 GHz range" and may be called millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical value of the frequency range of the NR system may be changed. For example, FR1 may include a band of 410 MHz to 7125 MHz as shown in Table 5 below. That is, FR1 may include a frequency band of 6 GHz (or 5850, 5900, 5925 MHz, etc.) or higher. For example, the frequency band of 6 GHz (or 5850, 5900, 5925 MHz, etc.) or higher included in FR1 may include an unlicensed band. The unlicensed band may be used for various purposes, for example, for communication for a vehicle (e.g., autonomous driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Hereinafter, an integrated access and backhaul (IAB) link is described. For convenience of description, proposed methods are described with reference to a new RAT (NR) system. However, the proposed methods may also be applied to other systems including 3GPP LTE/LTE-A systems in addition to the NR system.

One potential technology intended to enable future cellular network deployment scenarios and applications is supporting wireless backhaul and relay links, which enables a flexible and highly dense deployment of NR cells without needing to proportionally densify a transport network. It allows for flexible and very dense deployment.

With massive MIMO or a native deployment of multi-beam system, a greater bandwidth (e.g., mmWave spectrum) is expected to be available in NR than in LTE, and thus occasions for the development and deployment of integrated access and backhaul links arise. This allows an easy deployment of a dense network of self-backhauled NR cells in an integrated manner by establishing a plurality of control and data channels/procedures defined to provide connection or access to UEs. This system is referred to as an integrated access and backhaul (IAB) link.

The following definitions are provided in the disclosure.

AC(x): Access link between node(x) and UE(s)

BH(xy): Backhaul link between node(x) and node(y)

Here, a node may refer to a donor gNB (DgNB) or a relay node (RN), where a DgNB or a donor node may be a gNB that provides a function of supporting a backhaul for IAB nodes.

In the disclosure, for convenience of description, when there are relay node 1 and relay node 2 and relay node 1 is connected to relay node 2 through a backhaul link to relay data transmitted to and received from relay node 2, relay node 1 is referred to as a parent node of relay node 2 and relay node 2 is referred to as a child node of relay node 1.

The following drawings are provided to explain specific examples of the present specification. Terms for specific devices illustrated in the drawings or terms for specific signals/messages/fields illustrated in the drawings are provided for illustration, and thus technical features of the present specification are not limited by the specific terms used in the following drawings.

Figure 7:
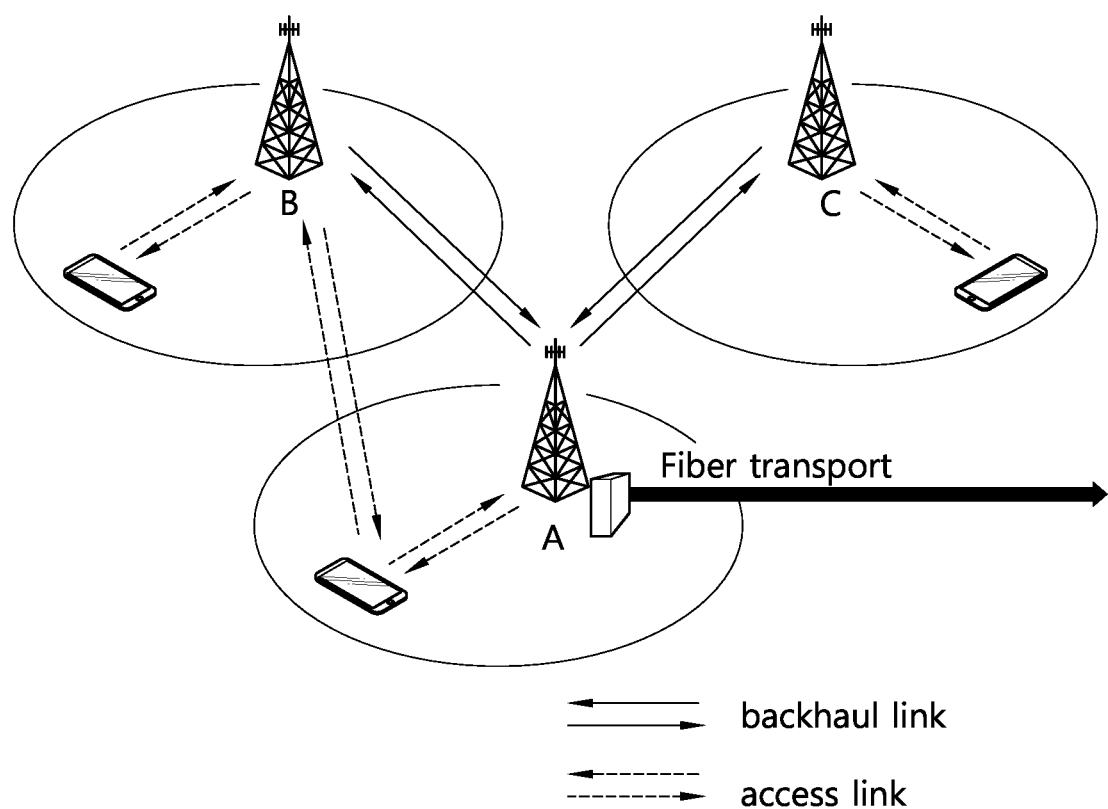
FIG. 7 schematically illustrates an example of a network having an integrated access and backhaul (IAB) link.

FIG. 7 schematically illustrates an example of a network having an integrated access and backhaul (IAB) link.

Referring to FIG. 7, relay nodes (rTRPs) may multiplex access and backhaul links in a time, frequency, or space domain (i.e., a beam-based operation).

Different links may operate on the same frequency or on different frequencies (which may be referred to as an in-band relay and an out-band relay, respectively). It is important to efficiently support out-band relays for some NR deployment scenarios, while it is crucial to understand requirements for an in-band operation involving close interworking with an access link operating on the same frequency to accommodate duplex constraints and to avoid/mitigate interference.

Furthermore, operating an NR system in a millimeter wave spectrum has unique challenges, including experiencing severe short-term blocking which may not be easily mitigated by a current RRC-based handover mechanism due to a greater scale of time required to complete the procedure than that for short-term blocking. To overcome short-term blocking in a millimeter wave system, a fast RAN-based mechanism for switching between rTRPs that does not necessarily require inclusion of a core network may be required. A demand for mitigation of short-term blocking for an NR operation in a millimeter wave spectrum, along with a demand for easier deployment of self-backhauled NR cells, raises a need for development of an integrated framework that allows fast switching of access and backhaul links. Over-the-air coordination between rTRPs may also be considered to mitigate interference and to support end-to-end path selection and optimization.

The following requirements and aspects need to be achieved by an IAB for NR.

Efficient and flexible operation for in-band and out-band relaying in indoor and outdoor scenarios Multi-hop and redundant connection End-to-end path selection and optimization Support of backhaul links with high spectral efficiency Support of legacy NR terminals;

Legacy NR is designed to support half-duplex devices. Thus, half duplex may be supported and useful in an IAB scenario. Furthermore, IAB devices with full duplex may also be considered.

Figure 8:
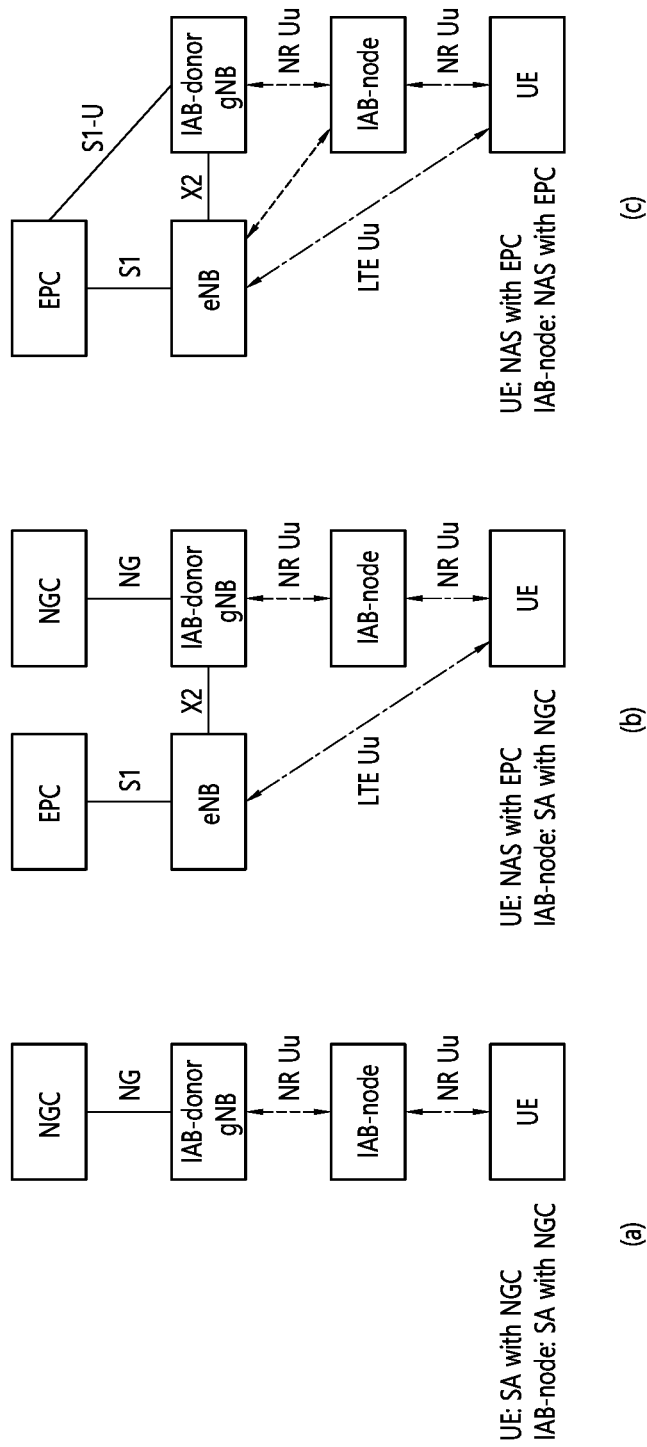
FIG. 8 shows an example of an operation of the IAB system in a standalone (SA) mode and a non-standalone (NSA) mode.

FIG. 8 shows an example of an operation of the IAB system in a standalone (SA) mode and a non-standalone (NSA) mode. Specifically, in FIG. 8, (a) shows an example of an operation of the terminal and IAB node considering NGC in the SA mode, (b) shows an example of an operation of the IAB node considering NGC in the SA mode and an operation of the terminal considering EPC in the NSA mode, and (c) shows an example of an operation of the terminal and the IAB node considering the EPC in the NSA mode.

The IAB node may operate in SA mode or NSA mode. When operating in NSA mode, the IAB node uses only the NR link for backhauling. A terminal connected to the IAB node may select an operation mode different from that of the IAB node. The terminal may further connect to a different type of core network than the connected IAB node. In this case, (e) DECOR ((enhanced) dedicated core network) or slicing may be used for CN selection. An IAB node operating in NSA mode may be connected to the same or different eNB(s). Terminals operating in the NSA mode may be connected to the same or different eNB from the IAB node to which they are connected. FIG. 8 shows an example in consideration of NGC in SA mode and an example in consideration of EPC in NSA mode.

In the IAB scenario, if each relay node (RN) does not have the scheduling capability, the donor gNB (DgNB) must schedule the entire links between the DgNB, related relay nodes and terminals. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the terminal is possible, and the backhaul/access link can be used more flexibly by reflecting the surrounding traffic conditions.

Figure 9:
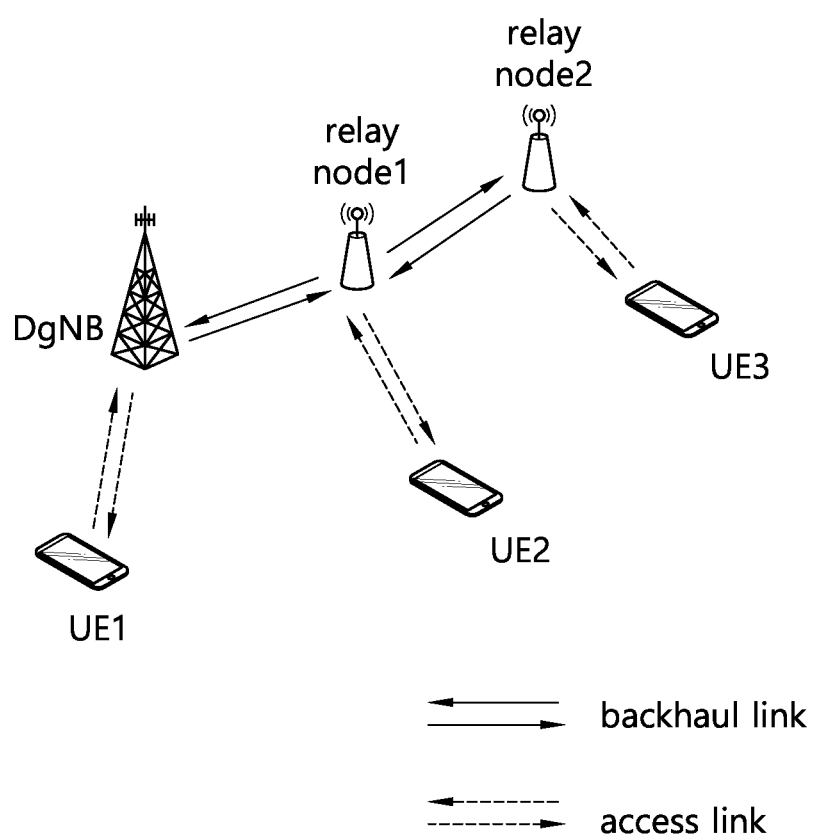
FIG. 9 schematically illustrates an example of the configuration of access and backhaul links.

FIG. 9 schematically illustrates an example of the configuration of access and backhaul links.

FIG. 9 shows an example in which a backhaul link and an access link are configured when there are a DgNB and IAB relay nodes (RNs). DgNB and RN1 are connected via a backhaul link, RN2 is connected to RN1 via a backhaul link, DgNB and UE1 are connected via an access link, RN1 and UE2 are connected via an access link, and RN2 and UE3 are connected via an access link.

Referring to FIG. 9, the DgNB receives not only a scheduling request from UE1 but also scheduling requests from UE2 and UE3. The DgNB determines scheduling of two back links and three access links and reports scheduling results. This centralized scheduling involves a scheduling delay and incurs latency.

On the other hand, distributed scheduling may be performed when each relay node has scheduling capability. Accordingly, it is possible to perform immediate scheduling in response to an uplink scheduling request from a UE terminal and to flexibly use backhaul/access links by reflecting surrounding traffic conditions.

Figure 10:
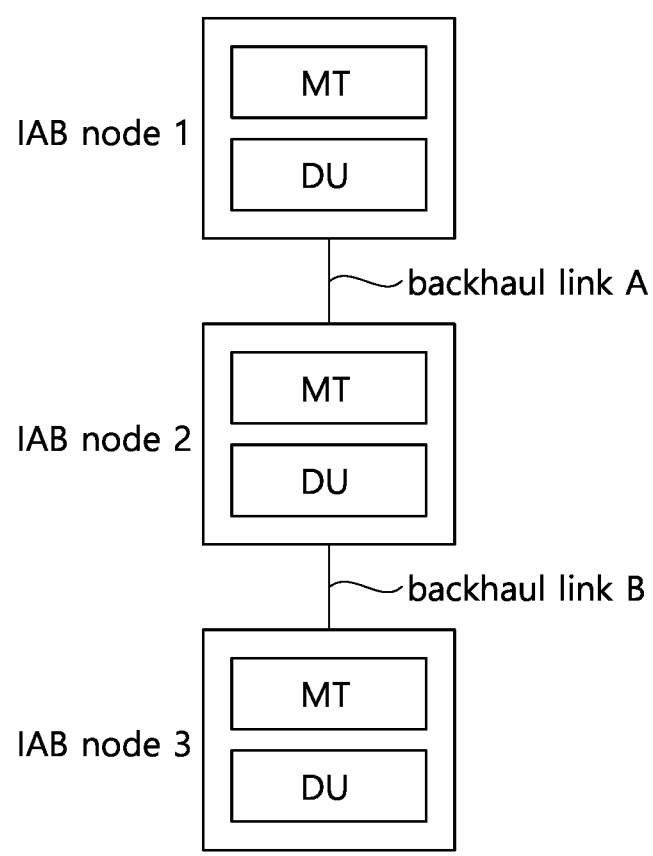
FIG. 10 illustrates a link and relationship between IAB nodes.

FIG. 10 illustrates a link and relationship between IAB nodes.

Referring to FIG. 10, IAB node 1 is connected with IAB node 2 through backhaul link A. With respect to backhaul link A, IAB node 1 is a parent node of IAB node 2, and IAB node 2 is a child node of IAB node 1. IAB node 2 is connected with IAB node 3 via backhaul link B. With respect to backhaul link B, IAB node 2 is a parent node of IAB node 3, and IAB node 3 is a child node of IAB node 2.

Here, each IAB node may perform two functions. One is a mobile termination (MT), which maintains a wireless backhaul connection to a higher IAB node or a donor node as, and the other is a distributed unit (DU), which provides an access connection with UEs or a connection with an MT of a lower IAB node.

For example, for IAB node 2, a DU of IAB node 2 functionally establishes backhaul link B with an MT of IAB node 3, and an MT of IAB node 2 functionally establishes backhaul link A with a DU of IAB node 1. Here, a child link of the DU of IAB node 2 may refer to backhaul link B between IAB node 2 and IAB node 3. A parent link of the MT of IAB node 2 may refer to backhaul link A between IAB node 2 and IAB node 1.

Hereinafter, IAB node synchronization and timing alignment are described.

Feasibility of over-the-air (OTA) synchronization and the impact of timing misalignment on IAB performance (e.g., the number of supportable hops) should be considered. Assuming a timing requirement of 3 us or less in IAB nodes within overlapping coverage, TA-based OTA synchronization can support multi-hop IAB networks (up to 5 hops) for FR2. TA-based OTA synchronization may not be sufficient to support multiple hops in FR1.

The following levels of alignments need to be considered between an IAB node/donor node or within an IAB node:

Slot-level alignment

Symbol-level alignment

No alignment.

A mechanism for timing alignment in a multi-hop IAB network is discussed. IAB supports TA-based synchronization between IAB nodes including multiple backhaul hops. Improvements to existing timing alignment mechanisms including TAs required for IAB nodes to support different transmission timing alignment cases are discussed.

The following transmission timing alignment case across IAB nodes and IAB donors is discussed.

Case 1: DL transmission timing alignment across IAB node and IAB donor: If downlink transmission and uplink reception are not well aligned at the parent node, the child node requires additional information on the alignment to properly set the downlink transmission timing of its own for the OTA-based timing and synchronization.

Case 2: Downlink and uplink transmission timings are aligned for one IAB node.

Case 3: Downlink and uplink reception timings are aligned for one IAB node.

Case 4: For one IAB node, in the case of transmission using Case 2 when receiving using Case 3.

Case 5: Case 4 for backhaul link timing and Case 1 for access link timing for one IAB node in different time slots Case 6: Sum of the downlink transmission timing of Case 1 and the uplink transmission timing of Case 2: The downlink transmission timing of all IAB nodes is aligned with a downlink timing of the parent IAB node or the donor; The uplink transmission timing of the IAB node may be aligned with the downlink transmission timing of the IAB node.

Case 7: Sum of the downlink transmission timing of Case 1 and the uplink reception timing of Case 3: The downlink transmission timings of all IAB nodes are aligned with the downlink timings of the parent IAB node or the donor; The uplink reception timing of the IAB node may be aligned with the downlink reception timing of the IAB node; If the downlink transmission and the uplink reception are not well aligned in the parent node, the child node needs additional information on the alignment in order to properly set its downlink transmission timing for OTA-based timing and synchronization.

Impact of different cases on TDM/FDM/SDM multiplexing of parent and child links, potential impact of incomplete timing adjustment, overhead of required downlink/uplink switching gap, cross-link interference, feasibility when one IAB node is connected to one or a plurality of parent nodes, and the impact of access terminals (in particular, compatibility with rel-15 terminals) are discussed.

Case 1 is supported for both access and backhaul link transmission timing alignment.

Cases 2-5 are not supported for IAB.

The use of case 6 for IAB nodes, if supported, should be under the control of the parent or network. To enable alignment of downlink transmission between IAB nodes, examples of the following solutions have been identified.

Alternative 1: IAB nodes may have to perform parallel (always time multiplexed) Case 1 and Case 6 uplink transmissions.

Alternative 2: Signaling between the parent and the IAB node on a time difference between downlink transmission and uplink reception timing at the parent node to correct potential misalignment of the downlink transmission timing at the child node: The child IAB node itself compare a corresponding difference between the downlink transmission timing and the backhaul reception timing of its own; If the signaled difference of the parent node is greater than that measured by the child node and if the transmission timing is smaller, the child node advances its transmission timing.

Here, Alternative 1 and Alternative 2 may have to maintain separate reception timing in the parent node for Case 6 uplink transmission from other child nodes.

Case 7 is compatible for the rel-15 terminals by introducing TDM between the child IAB node/rel-16 terminals supporting an effective negative TA and the new TA value and the child IAB node/terminal that does not support the new TA value. To enable alignment between downlink and uplink reception within the IAB node, examples of the following solutions have been identified.

Alternative 1: Negative initial time alignment (TA) to be applied to the child node of the IAB node to which the case 7 timing is applied is introduced Alternative 2: In the IAB node, a positive TA that enables symbol alignment rather than slot alignment between downlink reception and uplink reception is applied.

Alternative 3: Signaling of a relative offset of the most recent TA value, to be applied to the child node of the IAB node to which the case 7 timing is applied to achieve an efficient negative TA.

In addition to OTA synchronization, other techniques such as GNSS and PTP may be used to obtain synchronization between IAB nodes.

From an MT perspective of an IAB node, the following time-domain resources may be indicated for a parent link.
  downlink (DL) time resource
  uplink (UL) time resource
  flexible (F) time resource In an IAB node DU aspect, a child link may have the following time resource types.
  downlink (DL) time resource
  uplink (UL) time resource
  flexible (F) time resource
  not-available (NA) time resource (resource not used for a communication in a DU child link)

Meanwhile, each of a DL time resource, a UL time resource, and a flexible time resource of a DU child link may belong to one of the following two categories.
  hard resource: a time resource always available for a DU child link
  soft resource: a time resource for which an availability of a time resource for a DU child link is controlled by a parent node explicitly or implicitly In an IAB node DU aspect, for a child link, four types of time resources including a DL, a UL, an F, and an NA are present. The NA time resource means a resource which is not used for a communication on a DU child link.

Each of the DL, UL, and F time resources in a DU child link may be a hard resource or a soft resource. The hard resource may mean a resource always available for a communication on a DU child link. However, the soft resource may be a resource of which availability for a communication on a DU child link is controlled explicitly and/or implicitly by a parent node.

In the present disclosure, a configuration for a link direction and a link availability of a time resource for a DU child link may be called a DU configuration. The DU configuration may be used for effective multiplexing and interference handling between IAB nodes. For example, the DU configuration may be used to indicate whether a certain link is a valid link for a time resource between a parent link and a child link. In addition, only a subset of child nodes are configured to use a time resource for a DU operation, and the DU configuration may be used for interference handling. Considering such an aspect, the DU configuration may be more efficient when the DU configuration is configured semi-statically.

Meanwhile, similar to a slot format indication (SFI) configuration for an access link, an IAB node MT may have three types of time resources including a DL, a UL, and an F for its own parent link.

Hereinafter, proposals of the present disclosure will be described in more detail.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

The disclosure is described assuming an in-band environment but may also be applied in an out-band environment. Further, the disclosure is described in consideration of an environment in which a donor-gNB (DgNB), a relay node (RN), and/or a UE perform a half-duplex operation but may also be applied in an environment a DgNB, an RN, and/or a UE perform a full-duplex operation.

The present disclosure proposes a method for time domain synchronization of IAB nodes in an IAB system configured with multiple hops, in particular, methods for aligning downlink transmission timing. In other words, the downlink transmission timing may be the same between IAB nodes.

Meanwhile, in NR, timing advance (TA) is calculated by the following equation and assumes that the uplink transmission timing is advanced from a downlink reception timing.

$$T_{TA}=(N_{TA}N_{TA,offset})\cdot T_C \quad \text{[Equation 1]}$$

Here, $T_C$ is a basic time unit of NR, $N_{TA}$ is a timing difference between downlink and uplink, and $N_{TA,offset}$ is a fixed offset used for TA calculation. Meanwhile, the $N_{TA}$ and $N_{TA,offset}$ values may be values that the IAB node receives from its parent node or network.

Here, $T_C$ is defined as $T_C=1/(\Delta f_{max}\cdot N_f)$, $\Delta f_{max}$ is 480 kHz, and $N_f$ is 4096.

Meanwhile, $N_{TA,offset}$ may be defined based on the following table.

TABLE 6

| Frequency range and band of cell used for uplink transmission | $N_{TA, offset}$ (unit: $T_C$) |
|---|---|
| FR1 FDD band without LTE-NR coexistence case or FR2 TDD band without LTE-NR coexistence case | 25600 |
| FR1 FDD band with LTE-NR coexistence case | 0 |
| FR1 TDD band with LTE-NR coexistence case | 39936 |
| FR2 | 13792 |

Hereinafter, a method of synchronizing a time domain method of an IAB node proposed in the present disclosure will be described.

Figure 11:
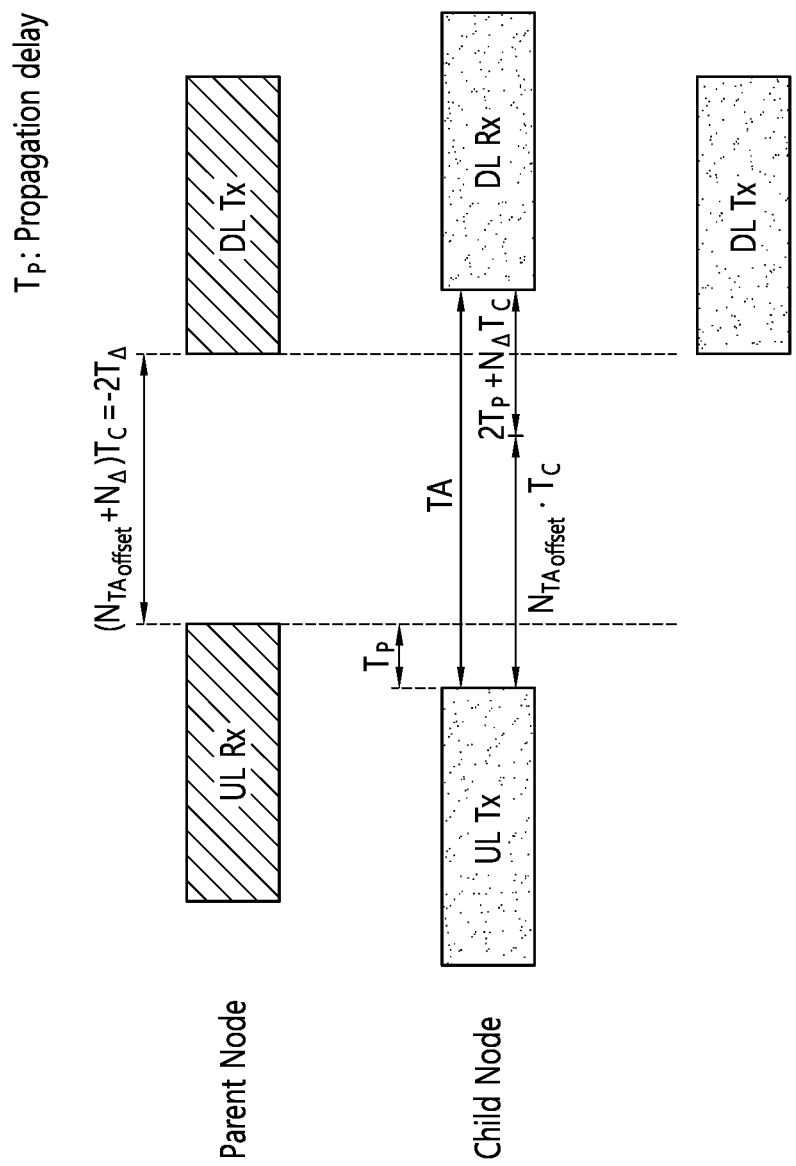
FIG. 11 shows an example of timing alignment in TDD based on the proposed methods of the present disclosure.

FIG. 11 shows an example of timing alignment in TDD based on the proposed methods of the present disclosure. In the example of FIG. 11, the parent node of FIG. 11 is an IAB node performing a DU operation on the child node of FIG. 11, and the child node of FIG. 11 is an IAB node performing an MT operation on the parent node of FIG. 11.

Referring to FIG. 11, a downlink transmission time of the parent node and a downlink transmission time of the child node are aligned with each other. In addition, a time interval between an uplink reception time of the parent node and a downlink transmission time of the parent node may be expressed as $(N_{TA,offset}+N_A)T_C=-2T_\Delta$. In addition, a time interval TA between the uplink transmission time of the child node and the downlink reception time of the child node may be expressed as $N_{TA,offset}\cdot T_C+2T_P+N_A T_C$. In this case, $T_P$ is a time interval between the uplink transmission time of the child node and the uplink reception time of the parent node, and is a propagation delay between the parent node and the child node.

Meanwhile, the TΔ value is a value determined by a time required for uplink-downlink switching and/or a time required for hardware characteristics, and may be a value with relatively small change.

Hereinafter, the proposed methods based on FIG. 11 will be described. That is, the following description is based on two IAB nodes. For example, in the following proposed method 1, the parent node is an IAB node that performs a DU operation on a child node, and conversely, the child node is an IAB node that performs an MT operation on the parent node. Meanwhile, it is obvious that the proposed methods of the present disclosure are not limited thereto.

(Proposed method 1) The child node calculates the downlink transmission timing by advancing it by $X=TA/2+T_\Delta$ from the downlink reception timing. Here, $T=N_A T_C$. Here, in the case of the X value, the X value is updated/calculated only when the TΔ value is updated/indicated from the parent node, and a TA value calculated from the most recently received/updated NTA value may be used as the TA value.

Figure 12:
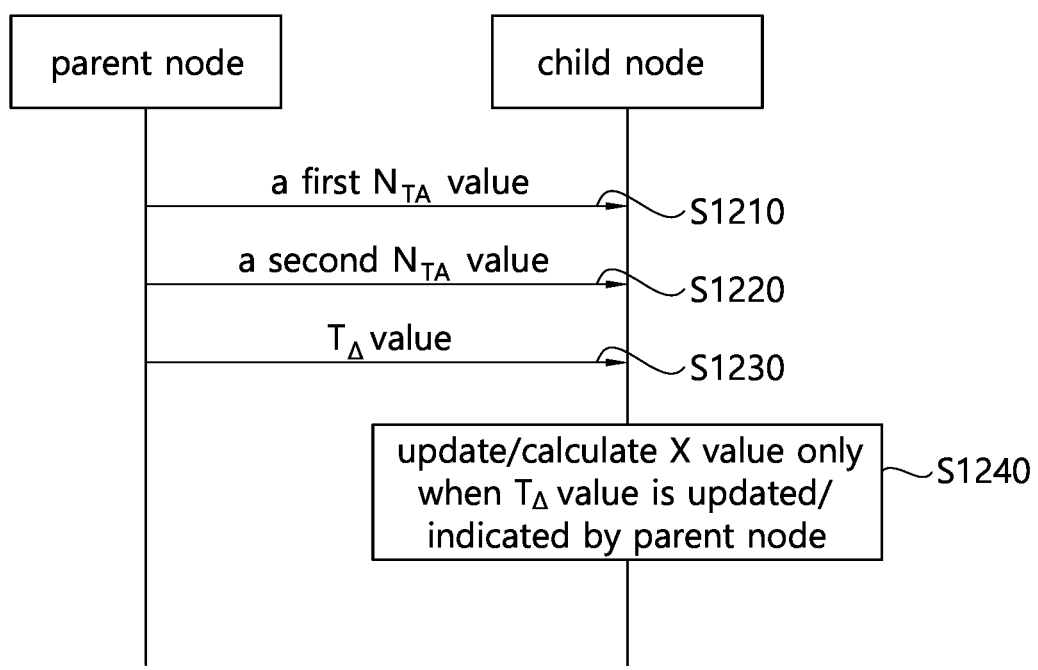
FIG. 12 is a flowchart of an example of a method for updating an X value based on Proposed Method 1.

FIG. 12 is a flowchart of an example of a method for updating an X value based on Proposed Method 1.

Referring to FIG. 12, the parent node transmits a first $N_{TA}$ value to the child node (S1210).

Thereafter, the parent node transmits a second $N_{TA}$ value to the child node (S1220).

Thereafter, the parent node transmits the $T_\Delta$ value to the child node (S1230).

The child node updates/calculates the X value only when the $T_\Delta$ value is updated/indicated by the parent node (S1240). Here, the child node may use the second $N_{TA}$ value and the $T_\Delta$ value when updating/calculating the X value.

If the child node adjusts the downlink timing whenever each of the TA value and the $T_\Delta$ value is updated, the downlink timing changes too frequently for the child node, increasing a probability that a timing error may occur. To prevent this, the parent node has a burden of continuously measuring its downlink/uplink timing gap even when establishing a TA. Therefore, using the proposed method 1, it is possible to reduce an error in the downlink timing of the child node. Here, $T_\Delta$ may be indicated to the child node through RRC signaling, MAC-CE signaling, or F1 Application Protocol (F1AP) signaling. Here, TA may be defined as an interval between downlink reception timing and uplink transmission timing as shown in FIG. 11.

(Proposed method 1-1) The child node calculates the downlink transmission timing by advancing it by $X=TA/2+T_\Delta$ from the downlink reception timing. Here, $T=N_A T_C$. Here, in the case of the X value, when the $T_\Delta$ value is received from the parent node, the X value is updated/recalculated using the most recent TA value to calculate the downlink transmission timing. In this case, the recent TA used to update/recalculate the downlink transmission timing may have to exist within a predetermined specific timing window. If there is no information on the new TA within the defined window, the downlink transmission timing may be updated/recalculated using the TA that is updated after the reception of the TΔ value, that is, the TA received from the parent node after the reception of a specific $T_\Delta$ or after a specific window, and applied.

The proposed method 1-1 is an embodiment of the proposal 1, and more specifically, is a proposal for an effective TA value for downlink transmission timing adjustment. That is, the child node may determine, as an effective value, a TA that is agreed in advance or included in a timing window set by the parent node or the donor gNB based on the time when the TΔ value is received, and update the downlink transmission timing.

Figure 13:
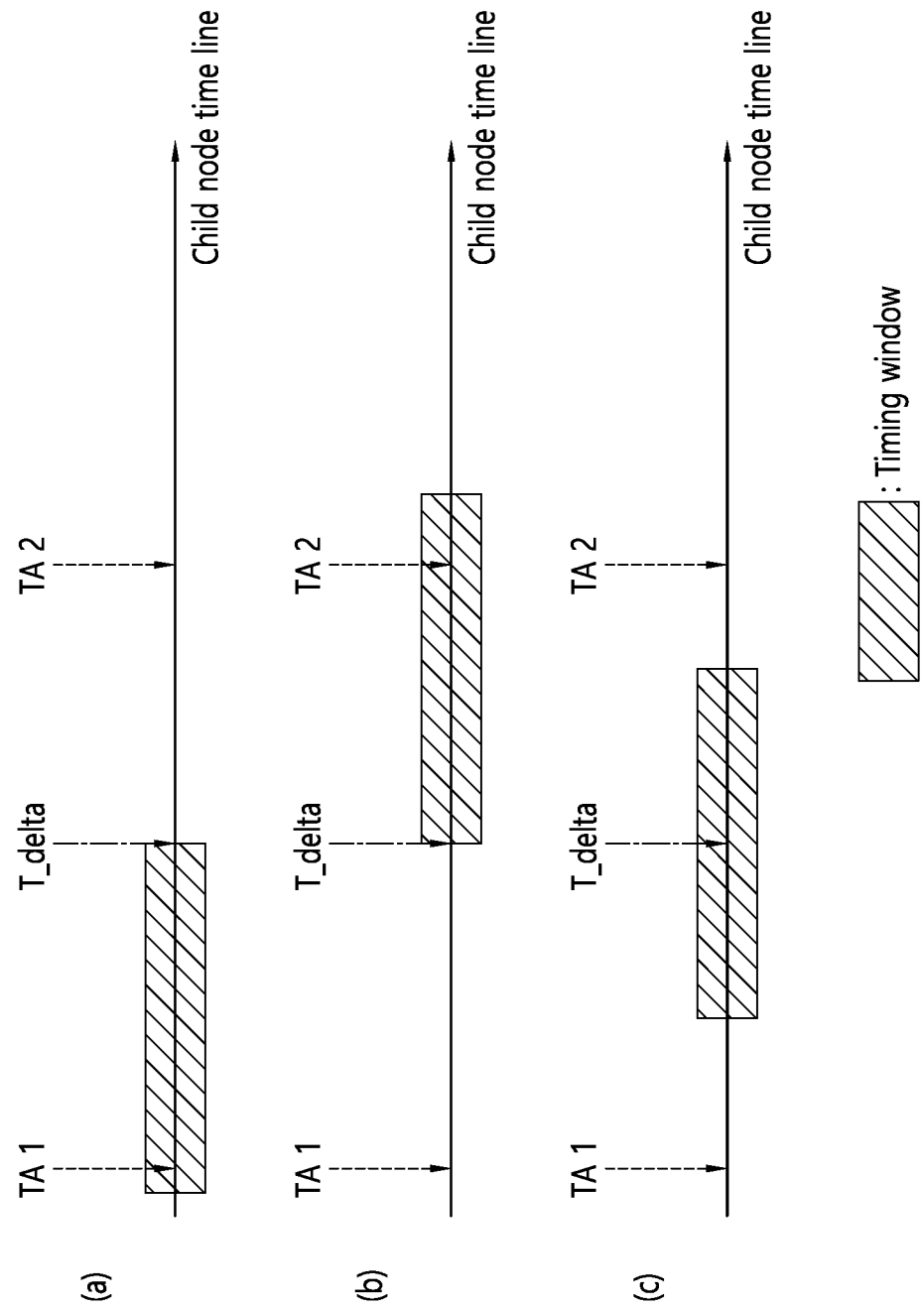
FIG. 13 shows an example to which the proposed method 1-1 is applied.

FIG. 13 shows an example to which the proposed method 1-1 is applied. Here, each of (a), (b) and (c) of FIG. 13 is an example in which the proposed method 1-1 is applied according to a position of the timing window.

Referring to FIG. 13, a position of the timing window may be set to include before and after $T_\Delta$ reception or including $T_\Delta$. Here, the size and position of the window may be previously agreed or may be set by the parent node or the donor gNB.

According to (a) of FIG. 13, TA1 included in the timing window is effective, and the child node may update the downlink transmission timing based on the TA1 value. According to (b) of FIG. 13, TA2 included in the timing window is effective, and the child node may update the downlink transmission timing based on the TA2 value. According to (c) of FIG. 13, since neither TA1 nor TA2 are included in the timing window, according to proposed method 1-1, the downlink transmission timing may be updated based on TA2, which is the TA value first received after TΔ is received.

Meanwhile, in the case of (b) of FIG. 13, the downlink transmission timing cannot be updated immediately at the time of TΔ reception, and may be updated after waiting until TA2 is received, but if the effective TA2 is not received, updating cannot be performed. To this end, the downlink transmission timing may be preferentially updated using the most recently received TA value at the $T_\Delta$ reception time, and the downlink transmission timing may be updated again at the time when an effective TA is newly received within the window of a later time point. That is, in the case of (b) of FIG. 13, at the $T_\Delta$ reception time, the child node updates the downlink transmission timing based on TA1 and $T_\Delta$, and again at the TA2 reception time, the child node updates the downlink transmission timing based on TA2 and $T_\Delta$. Alternatively, when a TA is not received within the window or when a TA or an effective TA is not received after receiving $T_\Delta$, the child node may perform a TA update request from the parent node.

(Proposed method 1-2) The child node calculates the downlink transmission timing by advancing it by X=TA/2+ $T_\Delta$ from the downlink reception timing. Here, T=$N_A T_C$. At this time, TA and $T_\Delta$ constituting the X value may be transmitted to the child node in pairs at once in the same signaling method such as RRC signaling and MAC-CE signaling, and the child node may calculate the downlink transmission timing using the TA and $T_\Delta$ values transmitted in pairs.

The proposed method 1-2 is related to both TA and $T_\Delta$ in the case of adjustment of the downlink transmission timing. In particular, the proposed method 1-2 advantageously removes ambiguity as to which value to set/calculate based on in the process of determining the downlink transmission timing of the child node when two values are transmitted through different signaling. As an example to which the proposed method 1-2 is applied, a TA configured with an existing MAC-CE is not used to adjust the downlink transmission timing, but a downlink transmission timing may be adjusted using the value only when it is indicated/configured to the child node as a pair of (TA, $T_\Delta$). As a representative example of the proposed method, when adjusting the overall target timing (e.g., downlink transmission timing) while maintaining the uplink/downlink gap of the parent node, it is necessary to change TA and $T_\Delta$, as described above, but when two values are not received at the same time, ambiguity about which value to follow cannot be eliminated.

In addition, in the case of TA, for example, when the mechanism of the existing NR is used, the TA value may be updated in the form of an accumulation of indicated TA values. However, in this case, the TA value between the parent node and the child node may be different, and thus a mismatch may occur. To solve this, the TA value indicated for the purpose of adjusting the downlink transmission timing is not indicated as a relative value for adjusting the accumulation value, but the absolute value of the TA may be indicated to the child node. That is, in ($N_{TA,new}$, $T_\Delta$) indicated for the purpose of adjusting the downlink transmission timing, $N_{TA,new}$ may be calculated by a formula (method of calculating initial TA indicated by RAR signaling of the RACH procedure) of $N_{TA}$=TA·16·641($2^\mu$), and in this case, the granularity of the $N_{TA}$ may be set to a value (e.g., a 12-bit value used in initial TA setup of the RACH procedure) higher than the timing granularity indicated by the 6-bit MAC-CE for general TA coordination rather than the RACH procedure. If the value of ($N_{TA,new}$, $T_\Delta$) is indicated by the same container as the existing TA by MAC-CE, it is indicated using a field independent of the existing TA field, in this case, granularity may be different from the existing TA value.

(Proposed method 1-3) Only one value of $T_{adjust}$=TA/2+ $T_\Delta$ is transmitted through RRC or MAC-CE signaling, and the downlink transmission timing may be set by advancing by $T_{adjust}$ from the downlink reception timing of the IAB node. In this case, $T_{adjust}$ uses a value having a finer granularity than TA.

The biggest feature of the method is that, the TA used in existing NR or LTE is a value advanced from the downlink reception timing and used to adjust the uplink transmission timing, and $T_{adjust}$ is used only for adjusting the downlink transmission timing from the downlink reception timing as signaling separate from TA. Adjustment of the downlink transmission timing is applied only when $T_{adjust}$ is received, and the downlink transmission timing is not changed due to a change in a separate TA or downlink reception timing. As another example, the $T_{adjust}$ value may be used for adjusting a propagation delay between a child node and a parent node.

In the case of the proposed method 1-3, fine tuning of the $T_{adjust}$ value based on TA-closed loop between the parent node and the child node is indicated, that is, the parent node instructs an uplink transmission timing of the childe node by a TA command, and the parent node calculates $T_\Delta$ and/or $T_{adjust}$ using the TA value calculated through a process of continuously adjusting the parent node receiving the uplink transmission timing of the child node to which the link transmission timing is applied to converge to a target timing, and instructed to the child node, thereby becoming robust to timing errors. Here, the TA value calculated through the above process is a value having finer granularity when compared with the existing TA command.

(Proposed method 1-4) The child node calculates the downlink transmission timing by advancing it by X=$TA_{avg}$/2+$T_{\Delta,avg}$ from the downlink reception timing. In this case, the $T_{\Delta,avg}$ value is a filtered (e.g., averaged) value of the past $T_{\Delta,avg}$ samples transmitted from the parent node to the child node, and $TA_{avg}$ is the filtered (e.g., averaged) value of the TA samples received from the child node.

Specifically, when the $T_\Delta$ sample at time $t_i$ is $T_\Delta(t_i)$, $T_\Delta(t_i)$ is a value obtained by multiplying the time difference between the downlink transmission timing and the uplink reception timing observed at time $t_i$ in the parent node by −0.5. That is, $T_\Delta(t_i)$=−(difference value obtained by subtracting the uplink reception timing from the downlink transmission timing observed at the parent node at the time ti)/2.

$TA_{avg}$ may be defined by the equation below.

$$TA_{avg} = \sum_{i=0}^{N-1} \alpha_i TA(t_i) \qquad \text{[Equation 2]}$$

$T_{\Delta,avg}$ may be defined by the equation below.

$$T_{\Delta,avg} = \sum_{j=0}^{M-1} \beta_j T_\Delta(t_j) \qquad \text{[Equation 3]}$$

Here, it is assumed that the number of samples of TA and $T_\Delta$ is N (0, . . . , N−1) and M (0, . . . , M−1), respectively. In the above definition, when TA and $T_\Delta$ are always received/calculated together, it is regarded that M=N and i=j. Here, $\alpha_i$ and $\beta_j$ may be predefined as filter coefficients or may be signaled by a CU or a parent node to a child node. In addition, N or M values, which are filter sizes or window sizes, may also be agreed in advance, or may be signaled by the CU or parent node to the child node. Alternatively, when the parent node additionally signals values to be sampled using a bit-map or the like, the child node may use only the corresponding value for filtering. Here, as an example, $\alpha_i=1/N$, $\beta_j=1/M$.

Meanwhile, in the above method, assuming that the propagation delays of the parent node and the child node are constant or quasi-constant, the propagation delay $TP(t_i)$ at time $t_i$ has an advantage in that a more accurate TP $TP(TP=TA_{avg}/2+T_{\Delta,avg})$ is estimated as a value obtained by filtering using samples of $TP(t_i)=TA(t_i)/2+T_\Delta(t_i)$.

Here, in a state in which the $TA_{avg}$ value is averaged by the child node and the TA value is averaged by the parent node, when the downlink transmission timing of the child node is intended to be changed, the parent node may signal $T_{\Delta,avg}$ to the child node and the child node may use a value obtained by adding the value to $TA_{avg}/2$ averaged by the child node itself. Through this, since the average value is used without using a specific sample, inconsistency between the TA and $T_\Delta$ values can be resolved, and an accurate value robust against noise/error may be used. The $T_\Delta$ value may be signaled by RRC or MAC-CE signaling, or a CU or a parent node may select which signaling to transmit and inform the child node.

In the case of the method, since the propagation delay is calculated on the premise that the propagation delay is constant or quasi-constant, for a transient section in which propagation delay is changed, for example, when the IAB node moves or a blockage state occurs, sample input may be excluded during filtering. The parent node may recognize as a phenomenon of deviating in one direction without shaking the TA within a stable range, and the child node may determine that a TA that increases or decreases in one direction is received. In other words, the parent node and the child node may perform filtering under the condition that only samples that swing back and forth within a tolerance interval are averaged while the TA is stable.

The method is a method of transmitting and correcting timing values corresponding to a state based on a premise of a fixed IAB node or assuming that the IAB node is movable but remains in a fixed state after movement. That is, the downlink timing may be calculated by subtracting the $TA_{avg}/2+T_{\Delta,avg}$ value based on an instantaneous value of a reception timing of a slot/symbol in which the $T_\Delta$ value is transmitted.

In the case of the proposed method 1-4, the X value may be updated/recalculated only when the $T\Delta,avg$ values are updated/indicated from the parent node for the X value. Alternatively, whenever the TA and/or $T_{\Delta,avg}$ values are updated, the downlink transmission timing may be updated using samples at the corresponding time $t_i$.

Meanwhile, when considering the mobile IAB node situation in which the IAB nodes are moving, a downlink reception average value (e.g., the filtering of samples for the downlink reception timing (averaged value)), rather than an instantaneous downlink reception timing, may be used as a reference.

That is, whenever a TA update is transmitted, the samples at the corresponding time $t_i$ are set as input values for filtering. The parent node calculates $TA_{avg}$, and the child node calculates $T_{\Delta,avg}$ values and the downlink reception average value, and then downlink transmission timing at the time of the transmission timing change may be calculated/ applied as a value obtained by subtracting the $TA_{avg}/2$ and $T_{\Delta,avg}$ values from the downlink reception average value (i.e., $DL\_RX_{avg}-TA_{avg}/2-T_{\Delta,avg}$). Here, the downlink reception average value ($DL\_RX_{avg}$) may be calculated based on the following equation.

$$DL\_RX_{avg} = \sum_{i=0}^{N-1} \gamma_i DL\_RX(t_i) \qquad \text{[Equation 4]}$$

Here, $\gamma_i$ is a coefficient of the filter.

In this case, all samples corresponding to TA updates may be used as filtering inputs even if TA, $T_\Delta$, and downlink reception timing are unstable. That is, in this case, the downlink transmission timing may be directly estimated based on $TA_{avg}$ and $T_{\Delta,avg}$ based on DL_RXavg.

As a case in which filtering such as average needs to be reset and restarted, there may be cases where the parent node changes its downlink timing, and while maintaining the downlink timing, an average value may be calculated using consistent filtering regardless of changes in TP, TA, and $T_\Delta$ as input. Based on this, the following method is proposed.

(Proposed method 1-5) Like a mobile IAB node, when there is movement of the IAB node or when the channel environment is changed, the child node may calculate by advancing the downlink transmission timing by $X(X=TA_{avg}/2+T_{\Delta,avg})$ from the downlink reception timing.

The CU or the parent node may instruct the child node which method to use among the Proposed Methods 1-4 and the Proposed Methods 1-5 based on the channel environment or the capability of the IAB node.

Meanwhile, the downlink transmission timing for a given time may be calculated as follows.

$$DL\_TX(t) = DL\_RX(t) - \frac{TA(t)}{2} - T_\Delta(t) \qquad \text{[Equation 5]}$$

For the above equation, an actual TA(t) value used by the child node is TA(t)=DL_RX(t)−UL_TX(t). Here, UL_TX(t) is a timing at which the UE performs uplink transmission by reflecting the actual TA. That is, the TA command is derived to a target timing set by the parent node, but is established in reality, by the actual TA(t) at the transmission time t, that is, a difference value obtained by subtracting the transmission timing from the downlink reception timing at the IAB node MT at the time t.

Therefore, when the actual TA ($TA_{actual}$) is reflected in the above equation, the following equation is obtained.

$$DL\_TX(t)=\tfrac{1}{2}\cdot[DL\_RX(t)+UL\_TX(t)]-T_\Delta(t) \qquad \text{[Equation 6]}$$

In other words, since the TA command does not play a role in the actual valid expression in the child node, the operation to use the parameter may not be appropriate. Interpreting Equation 6 above, a median value of an uplink transmission timing of the IAB node at the uplink transmission time t, which is actual values that the IAB node may always record (e.g., the value stored in the buffer to take a filter such as the average, as in the proposed methods) and a downlink reception timing (observed at the same time t as the transmission time in most implementations) used as a reference to obtain a transmission timing thereof, that is, [DL_RX(t)+UL_TX(t)]/2 may be calculated, and $T_\Delta(t)$ (generally a negative value) may be subtracted therefrom to obtain a downlink transmission timing.

When the above equation is extended to a mobile IAB node or a mobile relay, the average or low-pass filtered operation (expressed as a subscript avg in Equation 7 below) may be taken as it is, as in Proposed Methods 1 to 1-5. Therefore, it may be expressed as the following equation.

$$DL\_TXextim_{ate} =$$
$$DL\_TXavg(t) = \frac{1}{2} \cdot [DL\_RXavg(t) + UL\_TXavg(t)] - T_{\Delta,avg}(t)$$
[Equation 7]

Therefore, the IAB node filters and records the median values of the uplink transmission timing and the downlink reception timing, and the parent node filters and records the $T_A(t)$ observed by itself and transmits it to the IAB node at a required time. Then, the IAB node may obtain a downlink transmission estimation value ($DL\_TX_{estimate}$) using the Equation.

Meanwhile, even if the IAB node records and has $DL\_RX_{avg}(t)$ and $UL\_TX_{avg}(t)$ separately and combines the values, since averaging or filtering is a linear operation, the downlink transmission estimation value may estimate a downlink transmission timing equally based on Equation 7 above.

In general, filtering may set an arbitrary length within a section in which the parent node does not change the downlink transmission timing by itself. Therefore, when the parent node changes its downlink transmission timing, the parent node takes filtering until a stable new $T_{\Delta,avg}(t)$ is obtained, and transmits the new $T_{\Delta,avg}(t)$ to the child node, and the child node may continue filtering for an arbitrary time until it receives a new value, and when a new $T_{\Delta,avg}(t)$ is received, the child node may reset the filtered values and newly perform all filtering operations.

In addition, an operation informing the parent node to take filtering for a specific period may be applied. Alternatively, the IAB node may be signaled to reset the filter through a flag at a timing of changing the downlink transmission timing.

(Proposed method 2) The child node reports the current $TA_{child}$-related information or $NTA_{,child}$-related information calculated as information on the $N_{TA}$ instructed/configured by the parent node to the parent node.

One of the causes of the mismatch in downlink timing between the child node and the parent node is that $N_{TA}$-related information possessed by the parent node and the child node may be different from each other. As shown in Equation 8 below, since the latest value of the $N_{TA}$ applied by the child node or the terminal is an accumulated value of $N_{TA}$ values indicated by the parent node or the base station, if the child node or the terminal misses the information or due to a detection error, etc., the $N_{TA}$-related information possessed by the parent node and child node has may be different from each other.

$$N_{TA\_new} = N_{TA\_old} + (T_A - 31) \cdot 16 \cdot 64/2^\mu$$
[Equation 8]

Therefore, an error may occur in the calculation of downlink timing advancing information (i.e., $TA/2+T_A$) of the child node calculated based on this. In order to solve this problem, the child node may report to the parent node the latest $N_{TA}$,child related information or $TA_{child}$ value calculated based on the information indicated by the child node from the base station. Here, a term in which child is added as a subscript means a term related to a child node.

Figure 14:
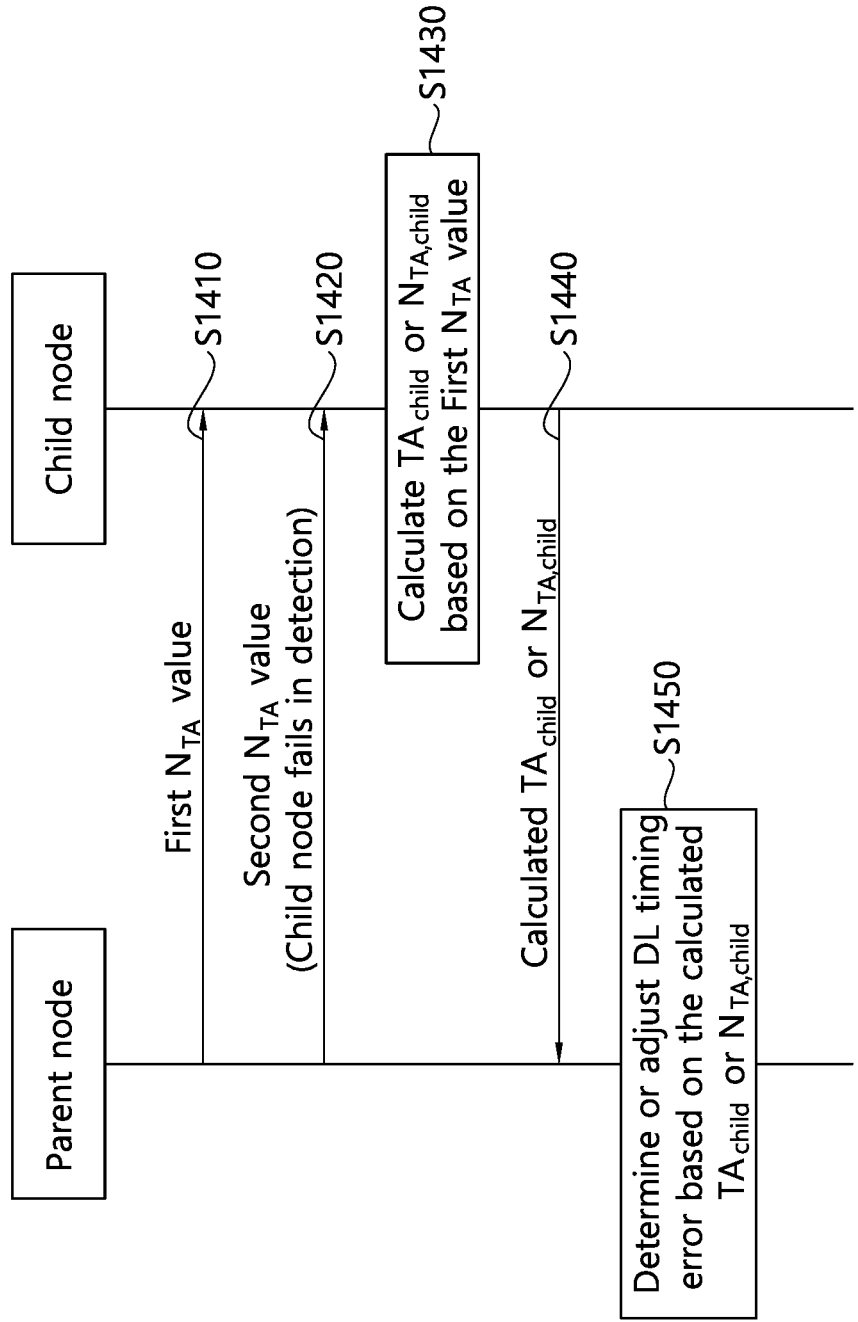
FIG. 14 is a diagram for an example of an operation between a parent node and a child node based on the proposed method 2.

FIG. 14 is a diagram for an example of an operation between a parent node and a child node based on the proposed method 2.

Referring to FIG. 14, the parent node transmits a first $N_{TA}$ value to the child node (S1410). In addition, the parent node transmits the second $N_{TA}$ value to the child node (S1420). Here, in FIG. 14, it is assumed that the child node does not detect the second $N_{TA}$ value.

Thereafter, the child node calculates $TA_{child}$ or $NTA_{,child}$ based on the first $N_{TA}$ value (S1430). Thereafter, the child node transmits the calculated $TA_{child}$ or $NTA_{,child}$ to the parent node (S1440).

The parent node receiving the $TA_{child}$ or $NTA_{,child}$ calculated by the child node determines a downlink timing error based on the calculated $TA_{child}$ or $NTA_{,child}$ and adjusts a downlink timing (S1450).

(Suggested method 2-1) If the child node has its own timing source, such as a global navigation satellite system (GNSS), the downlink transmission timing update may not be necessary, so that the child node may request omission of TΔ information transmission from the parent node or a donor node and may not expect the indication/setting of $T_A$ information from the parent node. Even if the corresponding information is transmitted from the parent node, the child node may ignore the corresponding information.

(Proposed method 3) When the downlink reception timing of the child node is changed due to a change in the downlink transmission timing of the parent node, the following options may be considered for the downlink transmission timing of the child node.

Option 1: When the downlink reception timing of the child node is changed and a new TA and/or $T_A$ value is not indicated from the parent node, the child node does not change the downlink transmission timing and maintains the existing downlink transmission timing.

Option 2: When a downlink reception timing of the child node is changed, the downlink transmission timing of the child node is always determined by [downlink reception timing−TA/2−$T_A$], where TA and $T_A$ is calculated as values most recently transmitted from the parent node.

Option 3: If the downlink reception timing measured by the child node does not deviate by more than a specific threshold and the TA and/or $T_A$ values are not indicated/set by the parent node, the child node does not change the downlink timing and maintains the existing downlink transmission timing.

Meanwhile, in the proposed method 3, when the downlink transmission timing of the parent node changes, the change may be caused by an intentional change by the parent node or hardware impairment (e.g., phase drift, etc.). In the latter case, in particular, if the child node continuously adjusts the downlink timing by changing the downlink reception timing, an error in the downlink transmission timing may increase. In the case of a multi-hop system, error propagation may be a big problem due to this phenomenon, so option 1 or option 3 may be relatively more appropriate for a child node.

Meanwhile, MAC-CE signaling related to $T_A$ may be indicated/configured with 11 bits.

Meanwhile, for the timing alignment case 1, the time interval expressed by $(N_{TA}+N_{TA,offset}) \cdot T_c/2+T_A$ may be divided into a $(N_{TA} \pm N_{TA,offset}) \cdot T_c/2$ part related to TA and $T_A$. Here, $N_{TA}$ may be determined by $N_{TA,new}=N_{TA,old}+(T_A-31) \cdot 16 \cdot 64/2^\mu$, and the $T_A$ value may be an index indicated/configured by MAC-CE. Meanwhile, the actual value of $T_A$ may be indicated/configured by MAC-CE. If $T_A$ is indicated/configured in the form of an index, the terminal may need a formula for calculating the actual $T_A$ value based on the index value. In this regard, an example of granularity and range for $T_A$ may be as follows.

The granularity of $T_A$ for IAB OTA timing alignment may be $64T_c$ for FR1 and $32T_c$ for FR2. In addition, the range of $T_A$ for different numerology may be as shown in the following table.

TABLE 7

| SCS [kHz] | Max $T_A$ [Tc] | Min $T_A$ [Tc] |
|---|---|---|
| 15 | $-N_{TA, offset}/2 + 6256$ | $-N_{TA, offset}/2 - 70528$ |
| 30 | $-N_{TA, offset}/2 + 6128$ | $-N_{TA, offset}/2 - 35328$ |
| 60 | $-N_{TA, offset}/2 + 6032$ | $-N_{TA, offset}/2 - 17664$ |
| 120 | $-N_{TA, offset}/2 + 6032$ | $-N_{TA, offset}/2 - 8816$ |

Meanwhile, one of the simple methods of mapping the index of $T_A$ to the actual $T_A$ value is to calculate the $T_A$ value by adding the minimum minimum $T_A$ value and the index of $T_A$ multiplied by the granularity (that is, $T_A$=Min $T_A$+ (granularity·$T_{A,index}$))) or to subtract the value obtained by multiplying the index of $T_A$ by the granularity from the maximum $T_A$ value (that is, $T_A$=Max $T_A$−(granularity· $T_{A,index}$)).

Here, with respect to the minimum value, the actual $T_A$ value may be replaced by (Min $T_A$+($T_{A,granularity}$· $T_{A,index}$))·$T_c$. Here, $T_{A,index}$ is an index obtained by MAC-CE, and Min $T_A$ and $T_{A,granularity}$ may be as shown in the following table.

TABLE 8

| Frequency Range (FR) | $T_{\Delta, granularity}$ [Tc] | SCS [kHz] | Min $T_A$ [Tc] | Range of $T_{\Delta, index}$ |
|---|---|---|---|---|
| FR1 | 64 | 15 | $-N_{TA, offset}/2_{-70528}$ | 0, . . . , 1200 |
| | | 30 | $-N_{TA, offset}/2_{-35328}$ | 0, . . . , 648 |
| | | 60 | $-N_{TA, offset}/2_{-17664}$ | 0, . . . , 371 |
| FR2 | 32 | 60 | $-N_{TA, offset}/2_{-17664}$ | 0, . . . , 741 |
| | | 120 | $-N_{TA, offset}/2_{-8816}$ | 0, . . . , 464 |

Also, TA and $T_A$ may generally have $N_{TA,offset}$, and the time interval of timing alignment case 1 may be expressed as $(N_{TA}/2+$Min $T'_A+T_{A,granularity}·T_A)·T_c$. Here, Min $T'_A$ may be as same as $T_A+N_{TA,offset}/2$ (that is, Min $T'_A=T_A+N_{TA,offset}/2$).

Meanwhile, when SCS is 60 kHz, the SCS may be used in both FR1 and FR2, so Min $T_A$ and Max $T_A$ may be as shown in the following table, but $N_{TA,offset}$ values may be different.

TABLE 9

| SCS [kHz] | Max $T_A$ [Tc] | Min $T_A$ [Tc] |
|---|---|---|
| 60 | $-N_{TA, offset}/2 + 6032$ | $-N_{TA, offset}/2 - 17664$ |

The present disclosure proposes a method of indicating signaling of $T_A$ applied to SCS of 60 kHz is through one signaling without distinction between FR1 and FR2, and interpreting and using it according to each FR.

That is, for 60 kHz SCS, the granularity may be applied as $32T_c$ regardless of FR, and in the FR1 60 kHz environment, only values corresponding to multiples of $64T_c$ among them may be used. In other words, if the index range of $T_A$ indicated at 60 kHz is 0, . . . , 741 (for example, if indicated by 10 bits), it may be determined/defined that only the even index (or odd index) is used as a valid value in FR1. If an odd index (or even index) is indicated, the IAB node regards the case as an error. In other words, the IAB node does not expect that the $T_A$ value is indicated as an odd index (or even index) if it is predetermined/predefined that a value of $T_A$ is indicated by an even index (or odd index) in the FR 60 kHz environment.

In another way, if it is predetermined/predefined that $T_A$ is indicated by an even index (or odd index) and if the indicated index is an odd index (or even index), it may be determined/defined that the IAB node uses an index that is +1 or −1 than the indicated value.

According to the present disclosure, for 60 kHz SCS, there is an advantage that the value of each FR can be reinterpreted by one signaling regardless of the FR.

As another method, a method of indicating or configuring the minimum and maximum values of the actual $T_A$ values that can be configured/indicated in all SCSs or all SCSs within a specific frequency range, and indicating this through one signaling may be considered. In this case, the IAB node may know in advance the corresponding frequency range and the range of index according to the SCS, and may apply it directly. In this case, a small value may be used for the granularity.

For example, as described above, the range of the actual $T_A$ of the maximum value may be expressed as shown in the following table. That is, in the example below, the maximum value is a value obtained by applying $N_{TA,offset}$ to 0, and the minimum value is a value obtained by applying $N_{TA,offset}$ to 39936Tc.

TABLE 10

| granularity | Min $T_A$ [Tc] | Max $T_A$ [Tc] | range |
|---|---|---|---|
| 32Tc | −90496 | 6256 | 0, . . . , 3024 |

Therefore, a total of 12 bits are used to indicate/transmit through MAC-CE, and according to the FR and SCS values configured in the corresponding band, the parent node/CU may configure/indicate $T_A$ for the IAB node.

If the above embodiment is divided by FR, it may be as follows. In the example below, the maximum value is a value obtained by applying $N_{TA,offset}$ to 0, and the minimum value is a value obtained by applying $N_{TA,offset}$ to 39936Tc.

TABLE 11

| | granularity | Min $T_A$ [Tc] | Max $T_A$ [Tc] | range |
|---|---|---|---|---|
| FR1 | 64Tc | −90496 | 6256 | 0, . . . , 1512 |
| FR2 | 32Tc | −37632 | 6032 | 0, . . . , 1365 |

Therefore, a total of 11 bits are used to indicate/transmit through MAC-CE, and according to the FR and SCS values configured in the corresponding band, the parent node/CU may configure/indicate $T_A$ for the IAB node, and in the above embodiment, the IAB nodes do not expect to receive a value configured outside the range of the indexes of $T_A$ that can be configured. Here, when a value outside the range is configured, operation may be performed to use a value within the nearest range (e.g., an actual $T_A$).

As another embodiment, if the calculation is performed with the maximum/minimum index that can be set/indicated in all SCSs or all SCSs within a specific frequency range, it may be as follows.

TABLE 12

| SCS [kHz] | Min $T_A$ index | Max $T_A$ index | Index step |
|---|---|---|---|
| 15 | 0 | 2400 | 2 |
| 30 | 1100 | 2396 | 2 |
| 60 | 1652 | 2393 | 1 or 2 (depending on FR) |
| 120 | 1928 | 2393 | 1 |

Based on the above table, an actual value of $T_A$ may be determined as $T_A=-N_{TA,offset}/2-70528+32 \cdot (T_{A,index})$.

Here, an index step of 2 may mean indicating using only even or odd values among the corresponding minimum or maximum index ranges. Therefore, a total of 12 bits are used to indicate/transmit through MAC-CE, and according to the FR and SCS values configured in the corresponding band, the parent node/CU may configure/indicate $T_A$ to a value existing in the above table for the IAB node, and in the above embodiment, the IAB nodes do not expect to receive a value configured outside the range of the indexes of $T_A$ that can be configured (i.e., the index values of the above table). Here, when a value outside the range is configured, operation may be performed to use a value within the nearest range (e.g., an index of $T_A$).

As a modified example of the above example, the following table is defined by dividing by FR.

TABLE 13

|  | SCS [kHz] | Min $T_A$ index | Max $T_A$ index |
|---|---|---|---|
| FR1 | 15 | 0 | 1200 |
|  | 30 | 550 | 1198 |
|  | 60 | 826 | 1197 |
| FR2 | 60 | 0 | 741 |
|  | 120 | 276 | 741 |

Here, an actual value of $T_A$ in FR1 may be calculated by actual $T_A=-N_{TA,offset}/2-70528+64 \cdot (T_{A,index})$, and an actual value of $T_A$ in FR2 may be calculated by actual $T_A=-N_{TA,offset}/2-17664+32 \cdot (T_{A,index})$, respectively.

Therefore, a total of 11 bits are used in FR1 and a total of 10 bits are used in FR2, and the corresponding bits are indicated/transmitted through MAC-CE. In accordance with the FR and SCS values set in the corresponding band, the parent node/CU may configure/indicate $T_A$ to the IAB node as a value existing in the table above. In the above embodiment, IAB nodes do not expect to receive a value set outside the range of indices of $T_A$ that can be configured (i.e., index values in the table above). Here, when a value outside the range is configured, an operation may be performed to use a value within the nearest range (e.g., an index of $T_A$).

Meanwhile although the above-described method has been described based on the minimum value, it is also applicable to a case where the maximum value is easily used.

Although the above proposals have been described based on $T_A$, it can be easily extended and applied to setting/instruction in which specific parameters having a multiple relationship in FR1 and FR2 (with different values for each SCS) are applied.

Figure 15:
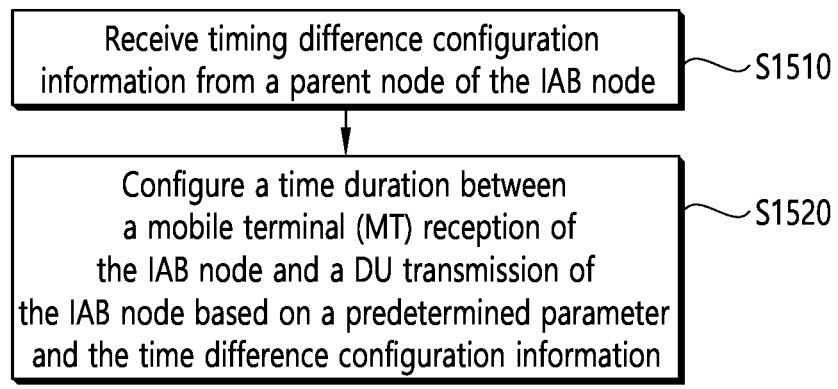
FIG. 15 is a flowchart for an example of a time difference setting method performed by an IAB node according to some implementations of the present disclosure.

FIG. 15 is a flowchart for an example of a time difference setting method performed by an IAB node according to some implementations of the present disclosure.

Referring to FIG. 15, an IAB node receives timing difference configuration information from a parent node of the IAB node (S1510).

Thereafter, the IAB node configures a time duration between a mobile terminal (MT) reception of the IAB node and a distribution unit (DU) transmission of the IAB node based on a predetermined parameter and the time difference configuration information (S1520). Herein, the MT reception may be a reception of a signal transmitted from the parent node by the IAB node, and the DU transmission may be a transmission of a signal transmitted from a child node of the parent node or an access user equipment (UE) by the IAB node.

Herein, the predetermined parameter is different according to a frequency range (FR) of the IAB node.

Meanwhile, since it is obvious that various methods/features proposed in the present disclosure can be applied to the method for configuring the time difference described based on FIG. 15, a redundant description will be omitted.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

The methods proposed in the present disclosure may be executable connected to at least one computer readable medium including an instruction based on the execution by at least one processor, one or more processors, and one or more memories executable connected to the processor and storing instructions, except an IAB node. The one or more processors may also be executed by an apparatus configured to control an IAB node, which executes the instructions and performs the methods proposed in the present disclosure.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 16:
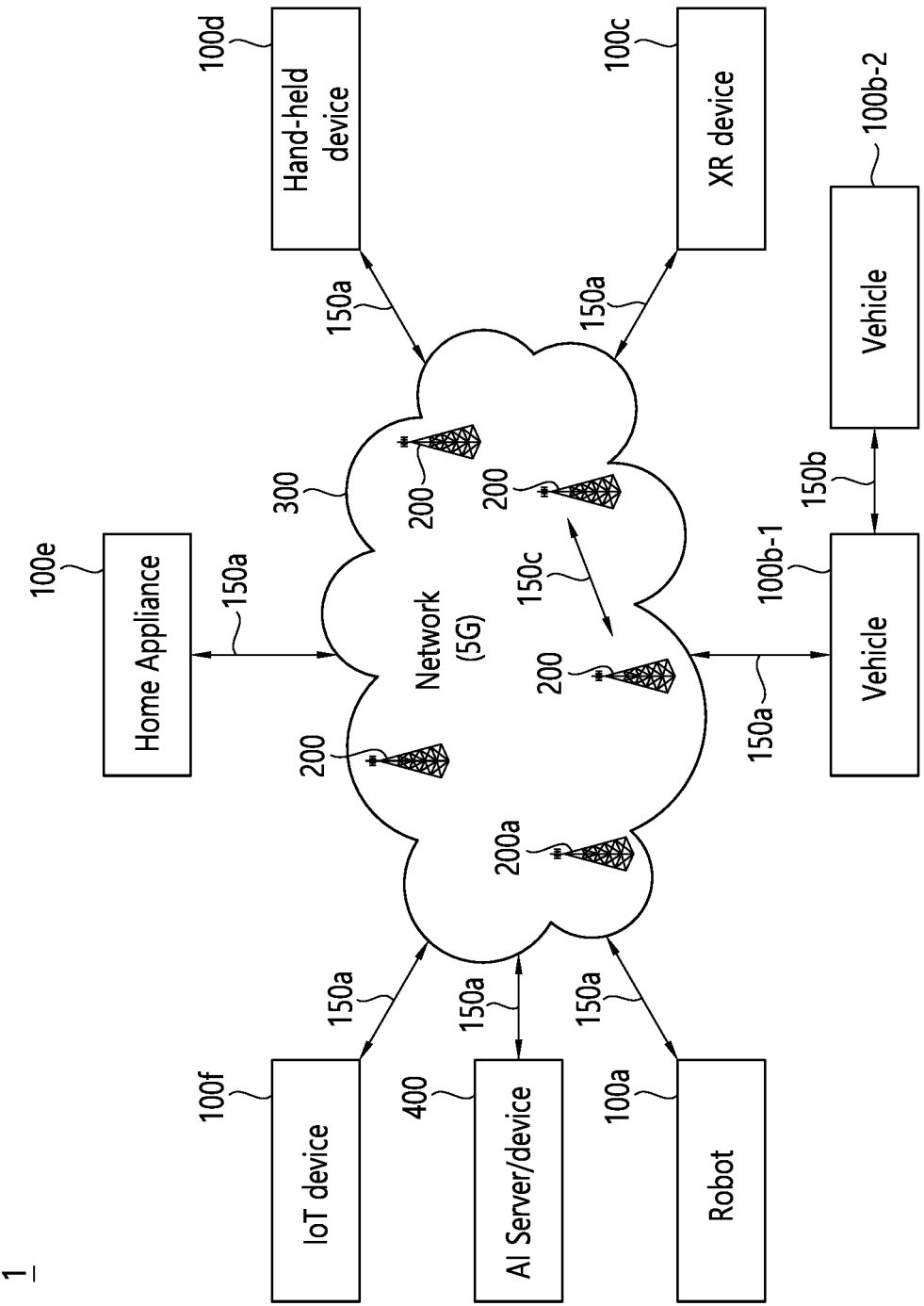
FIG. 16 illustrates a communication system 1 applied to the disclosure.

FIG. 16 illustrates a communication system 1 applied to the disclosure.

Referring to FIG. 16, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

Here, the wireless communication technology implemented in the wireless device of the present disclosure may include a narrowband Internet of Things for low-power communication as well as LTE, NR, and 6G. At this time, for example, NB-IoT technology may be an example of low power wide area network (LPWAN) technology, and may be implemented in standards such as LTE Cat NB1 and/or LTE Cat NB2, may be implemented in the standard of LTE Cat NB1 and/or LTE Cat NB2, and is not limited to the names mentioned above. Additionally or alternatively, the wireless communication technology implemented in the wireless device of the present disclosure may perform communication based on LTE-M technology. In this case, as an example, the LTE-M technology may be an example of an LPWAN technology, and may be called by various names such as enhanced machine type communication (eMTC). For example, LTE-M technology may be implemented by at least any one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the names described above. Additionally or alternatively, the wireless communication technology implemented in the wireless device of the present disclosure may include at least one of ZigBee, Bluetooth, and LPWAN considering low power communication and is not limited to the names described above. For example, the ZigBee technology may create personal area networks (PAN) related to small/low-power digital communication based on various standards such as IEEE 802.15.4, and may be called by various names.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 17:
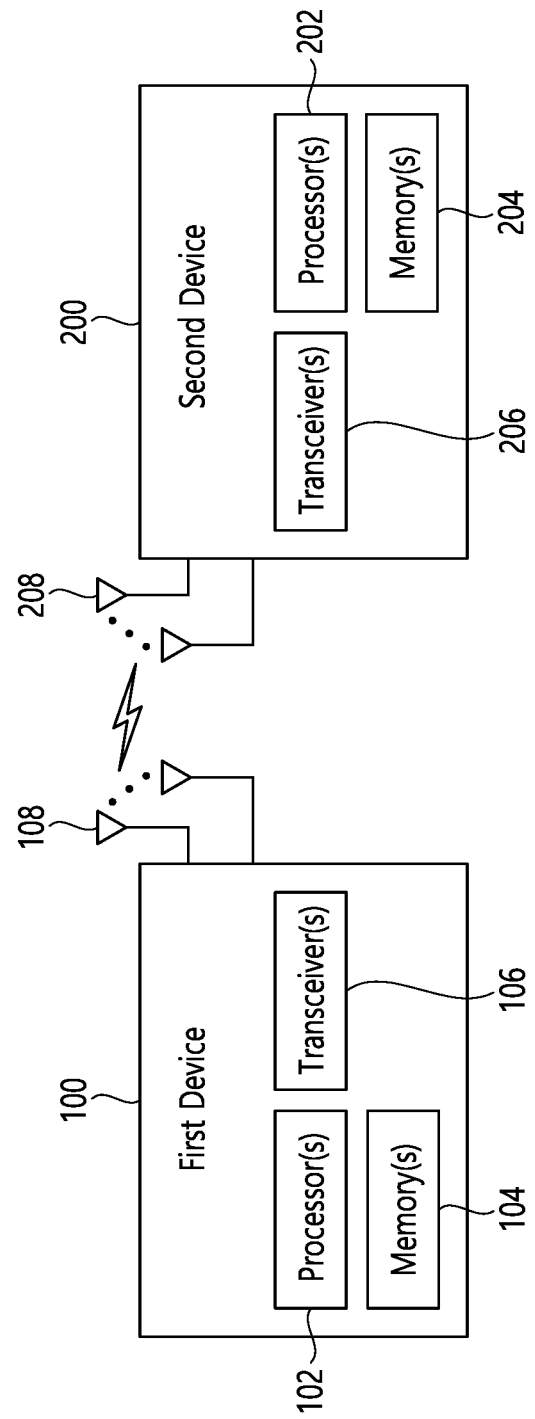
FIG. 17 illustrates a wireless device that is applicable to the disclosure.

FIG. 17 illustrates a wireless device that is applicable to the disclosure.

Referring to FIG. 17, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 16 and/or may respectively correspond to a wireless device 100x and a wireless device 100x of FIG. 16.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 18:
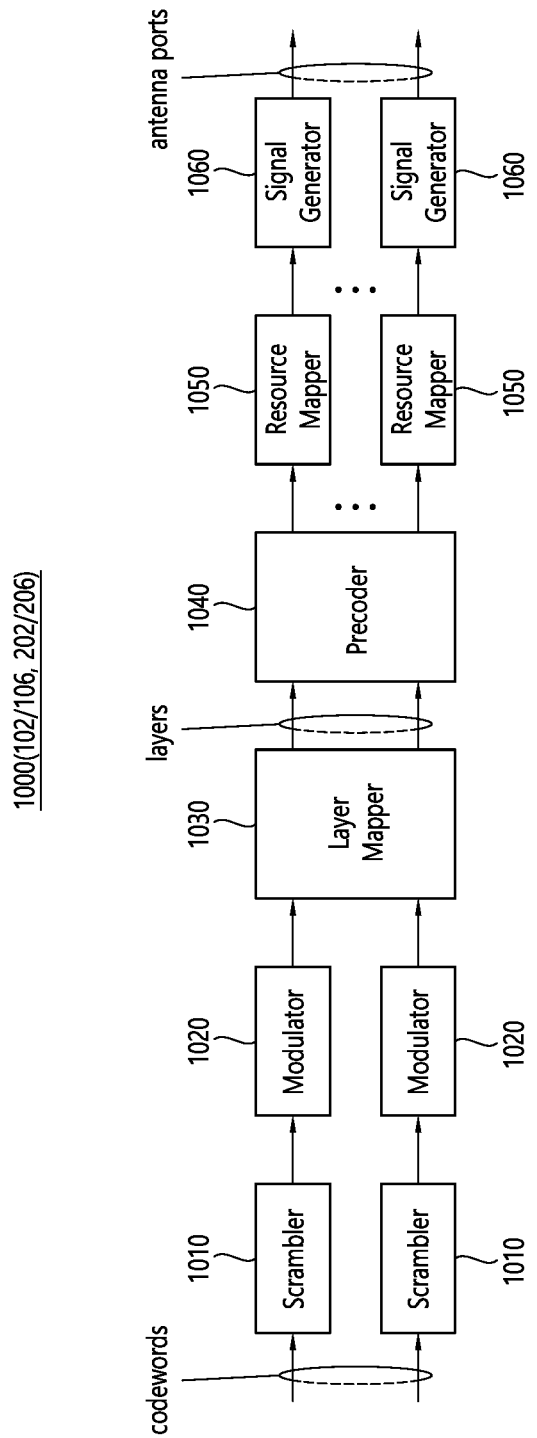
FIG. 18 illustrates a signal processing circuit for a transmission signal.

FIG. 18 illustrates a signal processing circuit for a transmission signal.

Referring to FIG. 18, the signal processing circuit 1000 may include a scrambler 1010, a modulator 1020, a layer mapper 1030, a precoder 1040, a resource mapper 1050, and a signal generator 1060. Operations/functions illustrated with reference to FIG. 18 may be performed, but not limited to, in the processor 102 and 202 and/or the transceiver 106 and 206 of FIG. 17. Hardware elements illustrated in FIG. 18 may be configured in the processor 102 and 202 and/or the transceiver 106 and 206 of FIG. 17. For example, blocks 1010 to 1060 may be configured in the processor 102 and 202 of FIG. 17. Alternatively, blocks 1010 to 1050 may be configured in the processor 102 and 202 of FIG. 17, and a block 1060 may be configured in the transceiver 106 and 206 of FIG. 17.

A codeword may be converted into a radio signal via the signal processing circuit 1000 of FIG. 18. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 18. For example, a wireless device (e.g., 100 and 200 of FIG. 17) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 19:
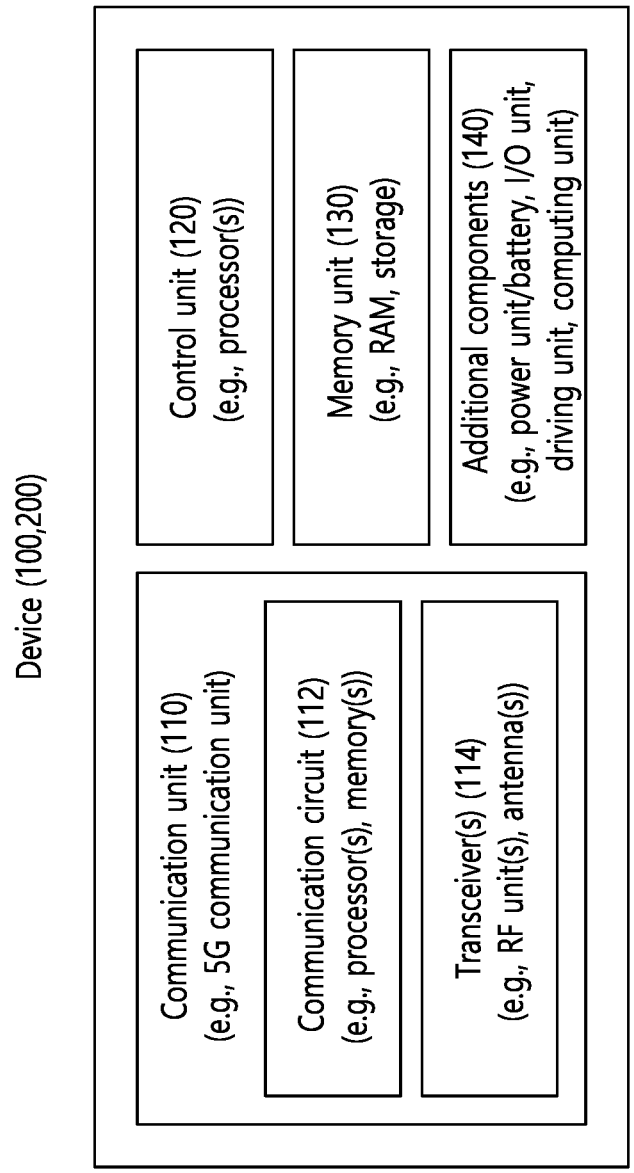
FIG. 19 illustrates another example of a wireless device applied to the disclosure.

FIG. 19 illustrates another example of a wireless device applied to the disclosure. The wireless device may be configured in various forms depending on usage/service.

Referring to FIG. 19, the wireless devices 100 and 200 may correspond to the wireless device 100 and 200 of FIG. 17 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 17. For example, the transceiver(s) 114 may include the at least one transceiver 106 and 206 and/or the at least one antenna 108 and 208 of FIG. 17. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 16), a vehicle (100 b-1 or 100 b-2 in FIG. 16), an XR device (100 c in FIG. 16), a hand-held device (100 d in FIG. 16), a home appliance (100e in FIG. 16), an IoT device (100f in FIG. 16), a terminal for digital broadcasting, a hologram device, a public safety device, an MTC device, a medical device, a fintech device (or financial device), a security device, a climate/environmental device, an AI server/device (400 in FIG. 16), a base station (200 in FIG. 16), a network node, or the like. The wireless device may be mobile or may be used in a fixed place depending on usage/service.

In FIG. 19, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 19 is described in detail with reference to the accompanying drawing.

Figure 20:
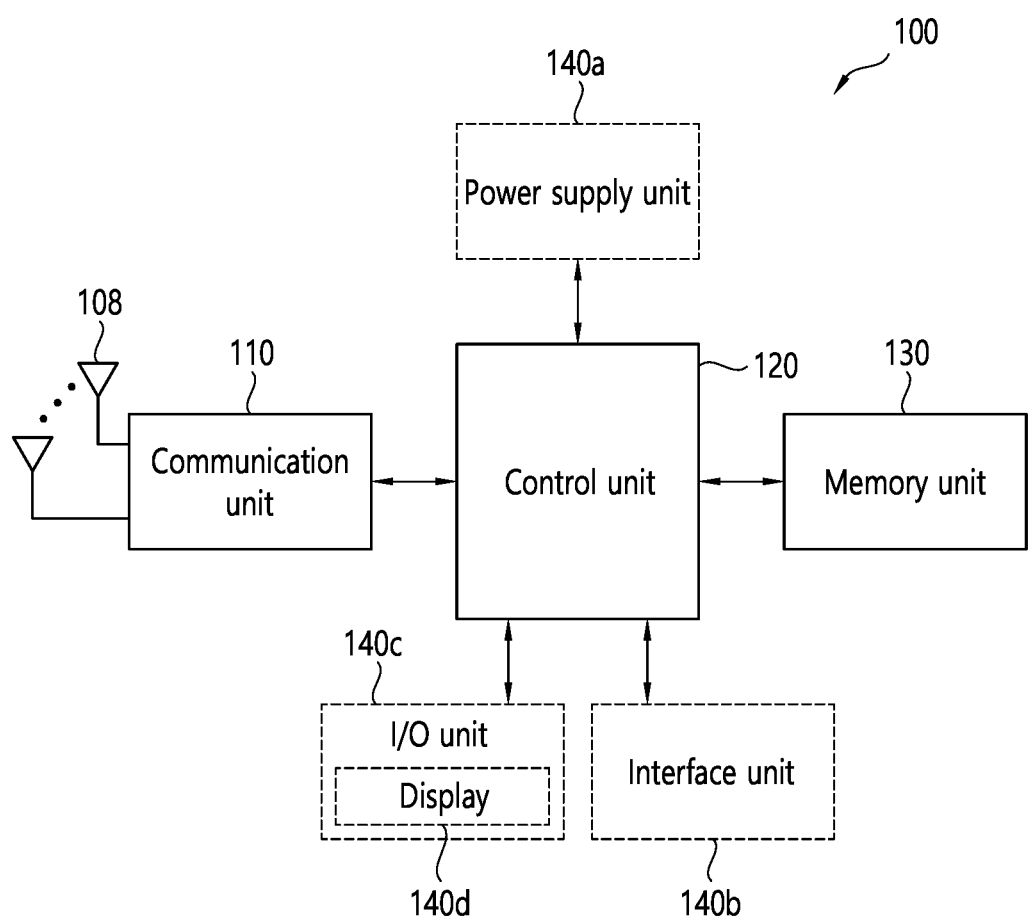
FIG. 20 illustrates a hand-held device applied to the disclosure.

FIG. 20 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 20, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 19, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 21:
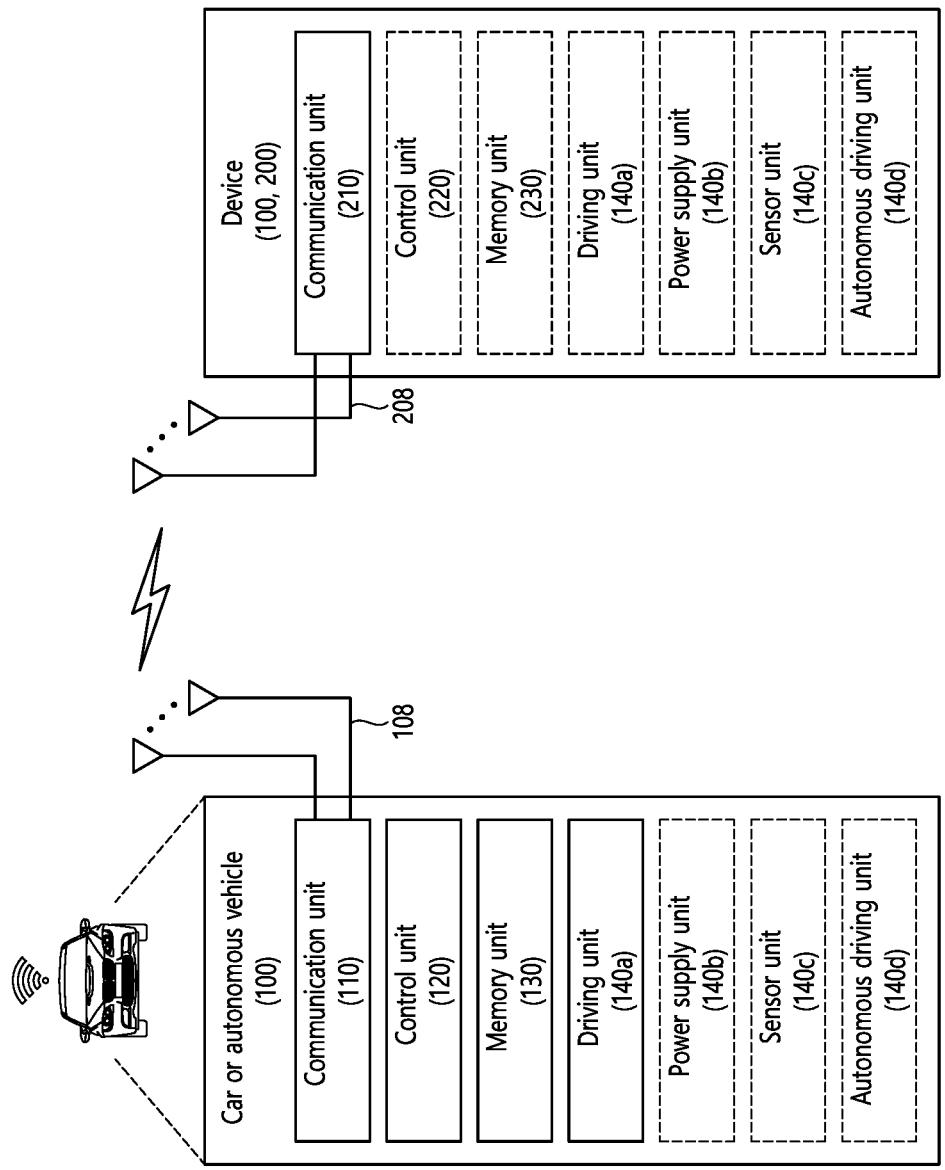
FIG. 21 illustrates a vehicle or an autonomous driving vehicle applied to the disclosure.

FIG. 21 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 21, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as apart of the communication unit 110. Blocks 110/130/140a to 140d correspond to the blocks 110/130/140 in FIG. 19, respectively.

The communication unit 110 may transmit and receive a signal (e.g., data, a control signal, or the like) to and from external devices, such as a different vehicle, a base station (e.g. a base station, a road-side unit, or the like), and a server.

The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 22:
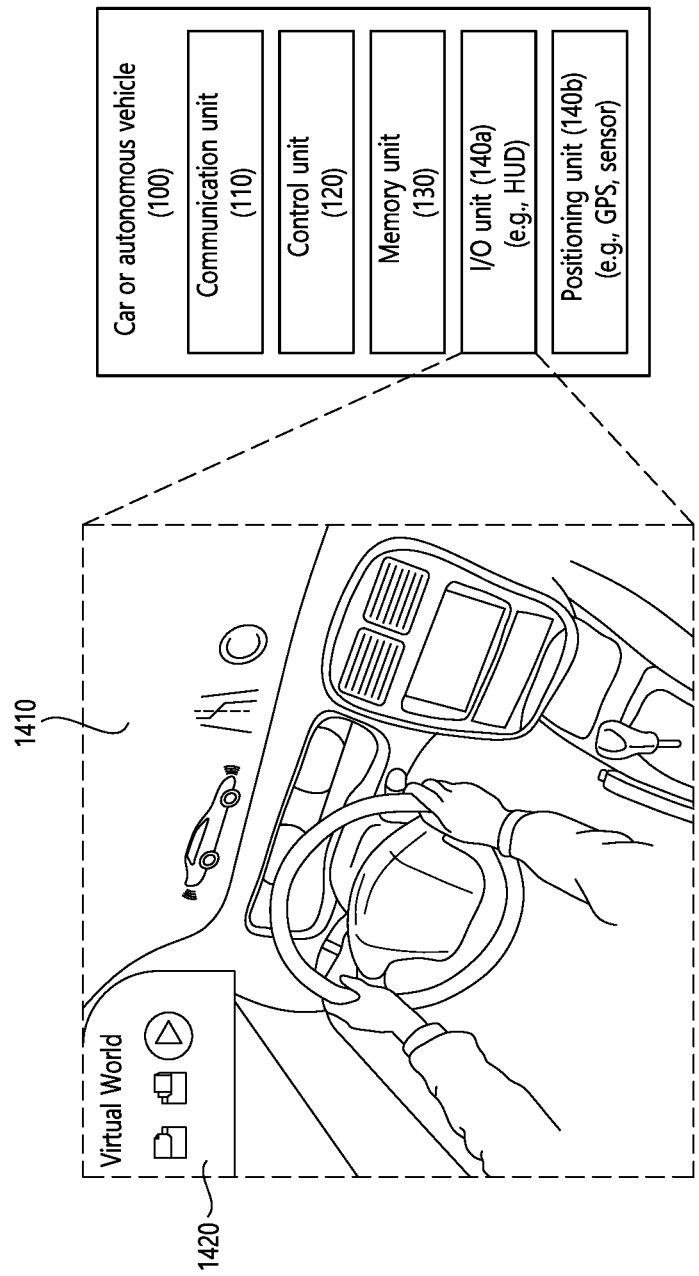
FIG. 22 illustrates a vehicle applied to the disclosure.

FIG. 22 illustrates a vehicle applied to the disclosure. The vehicle may be implemented as a means of transportation, a train, an air vehicle, a ship, and the like.

Referring to FIG. 22, the vehicle 100 may include a communication unit 110, a control unit 120, a memory unit 130, an input/output unit 140a, and a positioning unit 140b. Herein, blocks 110 to 130/140a to 140b correspond to block 110 to 130/140 of FIG. 19, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140*b* may acquire position information of the vehicle 100. The location information may include absolute location information of the vehicle 100, location information within a driving line, acceleration information, location information with a neighboring vehicle, and the like. The positioning unit 140*b* may include a GPS and various sensors.

For example, the communication unit 110 of the vehicle 100 may receive map information, traffic information, and the like from an external server and store it in the memory unit 130. The positioning unit 140*b* may obtain vehicle position information through GPS and various sensors and store it in the memory unit 130. The control unit 120 may generate a virtual object based on map information, traffic information, vehicle location information, and the like, and the input/output unit 140*a* may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140*a*. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 23:
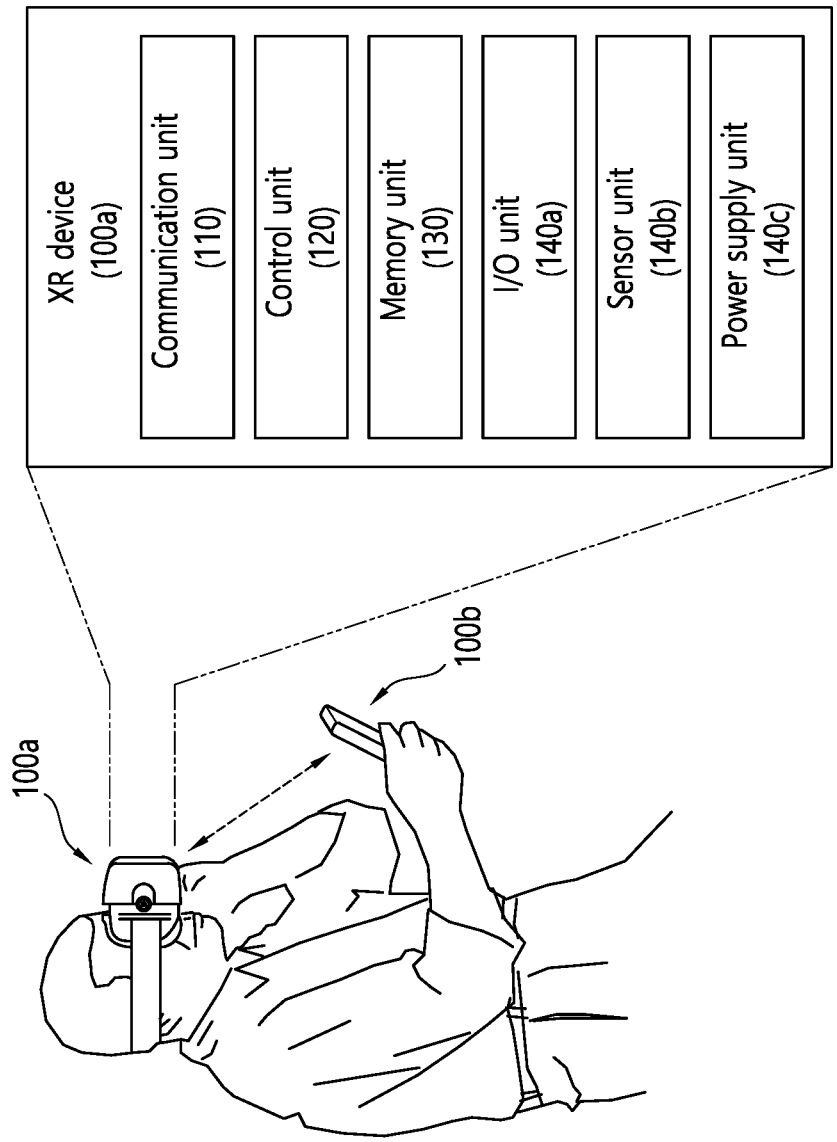
FIG. 23 illustrates a XR device applied to the disclosure.

FIG. 23 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 23, the XR device 100*a* may include a communication unit 110, a control unit 120, a memory unit 130, an input/output unit 140*a*, a sensor unit 140*b* and a power supply unit 140*c*. Herein, blocks 110 to 130/140*a* to 140*c* correspond to blocks 110 to 130/140 in FIG. 19.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100*a* to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100*a*/creating an XR object. The input/output unit 140*a* may obtain control information, data, and the like from the outside, and may output the generated XR object. The input/output unit 140*a* may include a camera, a microphone, a user input unit, a display unit, a speaker, and/or a haptic module. The sensor unit 140*b* may obtain an XR device state, surrounding environment information, user information, and the like. The sensor unit 140*b* may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140*c* supplies power to the XR device 100*a*, and may include a wired/wireless charging circuit, a battery, and the like.

For example, the memory unit 130 of the XR device 100*a* may include information (e.g., data, etc.) necessary for generating an XR object (e.g., AR/VR/MR object). The input/output unit 140*a* may obtain a command to operate the XR device 100*a* from the user, and the control unit 120 may drive the XR device 100*a* according to the user's driving command. For example, when the user wants to watch a movie or news through the XR device 100*a*, the control unit 120 transmits the content request information through the communication unit 130 to another device (e.g., the mobile device 100*b*) or can be sent to the media server. The communication unit 130 may download/stream contents such as movies and news from another device (e.g., the portable device 100*b*) or a media server to the memory unit 130. The control unit 120 controls and/or performs procedures such as video/image acquisition, (video/image) encoding, and metadata generation/processing for the content, and is acquired through the input/output unit 140*a*/the sensor unit 140*b* An XR object can be generated/output based on information about one surrounding space or a real object.

Also, the XR device 100*a* is wirelessly connected to the portable device 100*b* through the communication unit 110, and the operation of the XR device 100*a* may be controlled by the portable device 100*b*. For example, the portable device 100*b* may operate as a controller for the XR device 100*a*. To this end, the XR device 100*a* may obtain 3D location information of the portable device 100*b*, and then generate and output an XR object corresponding to the portable device 100*b*.

Figure 24:
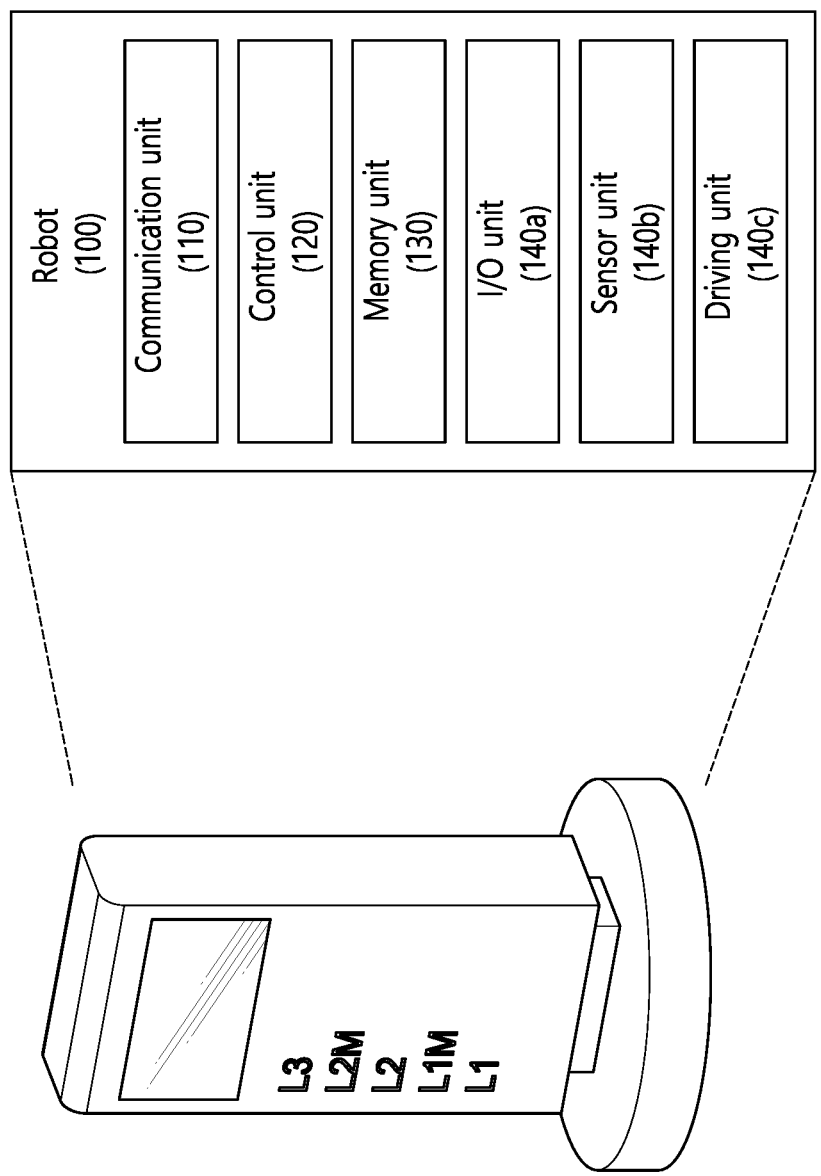
FIG. 24 illustrates a robot applied to the disclosure.

FIG. 24 illustrates a robot applied to the disclosure. The robot may be classified into industrial, medical, home, military, and the like depending on the purpose or field of use.

Referring to FIG. 24, the robot 100 may include a communication unit 110, a control unit 120, a memory unit 130, an input/output unit 140*a*, a sensor unit 140*b*, and a driving unit 140*c*. Herein, blocks 110 to 130/140*a* to 140*c* correspond to blocks 110 to 130/140 in FIG. 19.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140*a* may obtain information from the outside of the robot 100 and may output information to the outside of the robot 100. The input/output unit 140*a* may include a camera, a microphone, an user input unit, a display unit, a speaker, and/or a haptic module, etc. The sensor unit 140*b* may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140*c* may perform various physical operations such as moving a robot joint. In addition, the driving unit 140*c* may make the robot 100 travel on the ground or fly in the air. The driving unit 140*c* may include an actuator, a motor, a wheel, a brake, a propeller, and the like.

Figure 25:
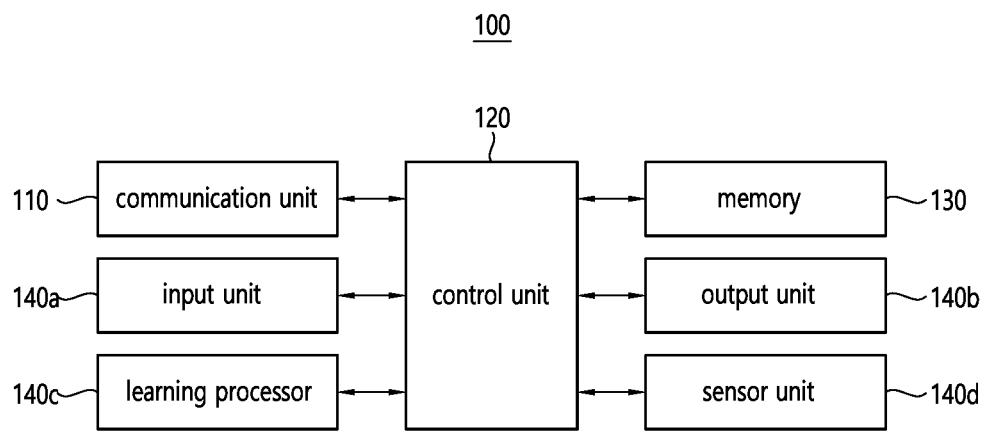
FIG. 25 illustrates an AI device applied to the disclosure.

FIG. 25 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 25, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 19, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 16) or an AI server (e.g., 400 in FIG. 16) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 16). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 16). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method, comprising:
receiving, by an integrated access and backhaul (IAB) node, a medium access control control element (MAC CE) including a $T_{delta}$ field for a value used to control an amount of timing adjustment from a parent node, wherein a length of the $T_{delta}$ field is 11 bits, and
determining a time difference between a distribution unit (DU) transmission of a signal from the parent node and reception of the signal by a mobile terminal (MT) of the IAB node, based on a predetermined parameter and the value provided by the $T_{delta}$ field,
wherein the predetermined parameter is different according to a frequency range (FR) of the IAB node.

2. The method of claim 1, wherein the signal is transmitted from a distribution unit (DU) of the parent node.

3. The method of claim 1, wherein a value of the predetermined parameter is set differently according to the FR.

4. The method of claim 1, wherein a subcarrier spacing (SCS) applicable for the IAB node is different according to the FR.

5. The method of claim 1, wherein the predetermined parameter is 64 or 32 according to the FR.

6. An integrated access and backhaul (IAB) node comprising:
at least one transceiver;
at least one memory; and
at least one processor operably connectable to the at least one transceiver and the at least one memory,
wherein the at least one memory stores instructions that, based on being executed by the at least one processor, cause the at least one processor to perform operations comprising:
receiving a medium access control control element (MAC CE) including a $T_{delta}$ field for a value used to control an amount of timing adjustment from a parent node, wherein a length of the $T_{delta}$ field is 11 bits, and
determining a time difference between a distribution unit (DU) transmission of a signal from the parent node and reception of the signal by a mobile terminal (MT) of the IAB node, based on a predetermined parameter and the value provided by the $T_{delta}$ field,
wherein the predetermined parameter is different according to a frequency range (FR) of the IAB node.

7. The IAB node of claim 6, wherein the signal is transmitted from a distribution unit (DU) of the parent node.

8. The IAB node of claim 6, wherein a value of the predetermined parameter is set differently according to the FR.

9. The IAB node of claim 6, wherein a subcarrier spacing (SCS) applicable for the IAB node is different according to the FR.

10. The IAB node of claim 6, wherein the predetermined parameter is 64 or 32 according to the FR.

11. An apparatus configured to control an integrated access and backhaul (IAB) node, comprising:
at least one transceiver:
at least one memory; and
at least one processor operably connectable to the at least one transceiver and the at least one memory, wherein the at least one memory stores instructions that, based on being executed by the at least one processor, cause the at least one processor to perform operations comprising:

receiving a medium access control control element (MAC CE) including a $T_{delta}$ field for a value used to control an amount of timing adjustment from a parent node, wherein a length of the $T_{delta}$ field is 11 bits, and determining a time difference between a distribution unit (DU) transmission of a signal from the parent node and reception of the signal by a mobile terminal (MT) of the IAB node, based on a predetermined parameter and the value provided by the $T_{delta}$ field, wherein the predetermined parameter is different according to a frequency range (FR) of the IAB node.

\* \* \* \* \*